United States Patent [19]

Segal et al.

[11] Patent Number: 4,725,674
[45] Date of Patent: Feb. 16, 1988

[54] WATER SOLUBLE MONOAZO AND DISAZO COMPOUNDS CONTAINING (DIPHENYLAMINO)-AMINO-CHLORO-TRIAZINYLAMINO GROUP SUBSTITUTED BY A NITRO GROUP AND A FIBRE-REACTION GROUP OF THE VINYLSULFONE SERIES, SUITABLE AS DYESTUFFS

[75] Inventors: Marcos Segal; Michael Kunze, both of Hofheim am Taunus, Fed. Rep. of Germany

[73] Assignee: Hoechst Aktiengesellschaft, Frankfurt am Main, Fed. Rep. of Germany

[21] Appl. No.: 841,290

[22] Filed: Mar. 19, 1986

[30] Foreign Application Priority Data

Mar. 21, 1985 [DE] Fed. Rep. of Germany ....... 3510180

[51] Int. Cl.$^4$ .............. C09B 62/028; C09B 62/03; C09B 62/51; C09B 62/513
[52] U.S. Cl. ................................ 534/637; 534/598; 534/617; 534/632; 534/638; 534/642; 534/831; 534/832; 534/840; 534/878; 534/879; 534/880
[58] Field of Search ............... 534/638, 617, 642, 637, 534/632, 634, 635, 636

[56] References Cited

U.S. PATENT DOCUMENTS

| 3,223,470 | 12/1965 | Boedeker et al. | 534/642 X |
| 4,540,418 | 9/1985 | Otake et al. | 534/642 X |
| 4,548,612 | 10/1985 | Kayane et al. | 534/642 X |

FOREIGN PATENT DOCUMENTS

| 65211 | 11/1982 | European Pat. Off. | 534/638 |
| 0094055 | 11/1983 | European Pat. Off. | 534/642 |
| 1179317 | 10/1964 | Fed. Rep. of Germany | 534/622 |
| 57-42986 | 3/1982 | Japan | 534/638 |
| 58-46185 | 3/1983 | Japan | 534/638 |
| 58-46186 | 3/1983 | Japan | 534/638 |
| 1013442 | 12/1965 | United Kingdom | 534/642 |

Primary Examiner—Floyd D. Higel

[57] ABSTRACT

Water-soluble monoazo and disazo compounds which have fiber-reactive dyestuff properties and containing as diazo component an optionally substituted phenyl radical or naphthyl radical or an optionally substituted phenylazophenyl, phenylazonaphthyl, naphthylazophenyl or naphthylazonaphthyl radical, and as coupling component that of a naphthol, aminonaphthaline or aminobenzene and as fiber-reactive group a group of the formula

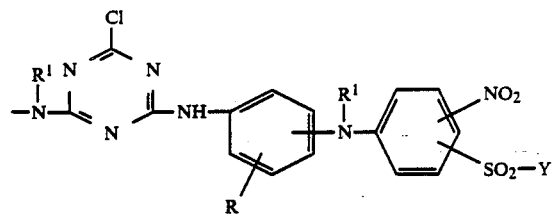

in which both $R^1$s, identical to or different from one another, denote a hydrogen atom or an optionally substituted alkyl group of 1 to 4 carbon atoms, R is a hydrogen atom or a sulfo group and Y represents a vinyl group or a $\beta$-thiosulfatoethyl, $\beta$-phosphatoethyl, $\beta$-chloroethyl or $\beta$-sulfatoethyl group, this fiber-reactive grouping being bonded to the radical of the coupling component. These azo compounds have fibre-reactive dyestuff properties and are suitable for dyeing carboxamide and/or hydroxy-containing materials, such as wool and synthetic polyamide fibers, in particular cellulose fibres, in deep and fast shades, when applied according to the usual methods of application and fixation, suitable for fibre-reactive dyestuffs.

18 Claims, No Drawings

WATER SOLUBLE MONOAZO AND DISAZO COMPOUNDS CONTAINING (DIPHENYLAMINO)-AMINO-CHLORO-TRIAZINYLAMINO GROUP SUBSTITUTED BY A NITRO GROUP AND A FIBRE-REACTION GROUP OF THE VINYLSULFONE SERIES, SUITABLE AS DYESTUFFS

The invention is in the technical field of fiber-reactive dyes.

European Patent Application Publication No. 0,094,055A and Japanese Patent Application Publication Nos. Sho-57-42,986, Sho-58-46,185 and Sho-58-46,186 disclose fiber-reactive azo dyes which contain a fiber-reactive radial from the vinylsulfonyl series and a further fiber-reactive radical from the monochlorotriazinyl series. However, the dyes described have certain defects, such as, for example, insufficient wet light and perspiration light fastness properties.

The present invention, then, provides new valuable water-soluble azo compounds which conform to the general formula (1)

A—N=N—K—Z     (1)

In this formula the symbols have the following meanings:

A is the phenyl radical which may be substituted by substituents, preferably one or two substituents, which preferably belong to the group of substituents consisting of alkyl of 1 to 4 carbon atoms, such as methyl and ethyl, alkoxy of 1 to 4 carbon atoms, such as methoxy and ethoxy, carboxy, alkanolyamino of 2 to 5 carbon atoms, which may be substituted, of which preferably for ex. acetylamino, optionally substituted benzoylamino, of which in particular benzoylamino and sulfobenzoylamino, phenylamino, sulfophenylamino, carbamoyl, carbamoyl which is monosubstituted or disubstituted by alkyl of 1 to 4 carbon atoms, sulfamoyl, sulfamoyl which is monosubstituted or disubstituted by alkyl of 1 to 4 carbon atoms, N-phenylsulfamoyl, N-phenyl-N-($C_1$–$C_4$-alkyl)-sulfamoyl, cyano, nitro, chlorine, bromine, fluorine, trifluoromethyl, hydroxy and sulfo, or A is a naphthyl radical which may be substituted by substituents, such as 1, 2 or 3 substituents, which preferably belong to the group of substituents consisting of sulfo, carboxy, methyl, ethyl, methoxy, ethoxy, alkanoylamino of 2 to 5 carbon atoms which may be substituted, of which preferably for ex. acetylamino, optionally substituted benzoylamino, of which in particular benzoylamino and sulfobenzoylamino, chlorine, hydroxy and nitro, or A is a radical of the general formula (2)

D—N=N—E—     (2)

in which

D is the phenyl radical which may be substituted by substituents, preferably 1 or 2 substituents, which preferably belong to the group of substituents consisting of alkyl of 1 to 4 carbon atoms, such as methyl and ethyl, alkoxy of 1 to 4 carbon atoms, such as methoxy and ethoxy, carboxy, alkanoylamino of 2 to 5 carbon atoms which may be substituted, of which preferably for ex. acetylamino, optionally substituted benzoylamino, of which in particular benzoylamino and sulfobenzoylamino, phenylamino, sulfophenylamino, carbamoyl, carbamoyl which is monosubstituted or disubstituted by alkyl of 1 to 4 carbon atoms, sulfamoyl, sulfamoyl which is monosubstituted or disubstituted by alkyl of 1 to 4 carbon atoms, N-phenylsulfamoyl, N-phenyl-N-($C_1$–$C_4$-alkyl)-sulfamoyl, cyano, nitro, chlorine, bromine, fluorine, trifluoromethyl, hydroxy and sulfo, or D is a naphthyl radical which may be substituted by substituents, such as 1, 2 or 3 substituents, which belong to the group of substituents consisting of sulfo, carboxy, methyl, ethyl, methoxy, ethoxy, alkanoylamino of 2 to 5 carbon atoms which may be substituted, of which preferably for ex. acetylamino, optionally substituted benzoylamino, of which in particular benzoylamino and sulfobenzoylamino, chlorine, hydroxy and nitro, and E is the radical of a couplable and diazotizable compound which in the synthesis of compounds (1) serves first as a coupling component and then as a diazo component, and represents a phenylene radical, preferably 1,4-phenylene radical, which may be substituted by 1 or 2 substituents which are selected from the set consisting of 2 alkyl of 1 to 4 carbon atoms, 2 alkoxy of 1 to 4 carbon atoms, 2 chlorine, 1 bromine, 1 alkanoylamino of 2 to 5 carbon atoms which may be substituted, of which preferably for ex. acetylamino, 1 benzoylamino, 2 sulfo, 1 carboxy, 1 N,N-dialkylamino having alkyl groups of 1 to 4 carbon atoms each, such as dimethylamino and diethylamino, 1 ureido, 1 phenylureido and 1 alkylsulfonylamino of 1 to 4 carbon atoms, or denotes a naphthylene radical, such as, for example, the 1,4-naphthylene radical, which may be substituted by 1 or 2 sulfo groups or by 1 alkyl group of 1 to 4 carbon atoms, 1 nitro group, 1 alkanoylamino group of 2 to 5 carbon atoms, such as an acetylamino group, or 1 benzoylamino group, or which may be substituted by 1 or 2 sulfo groups and 1 alkyl group of 1 to 4 carbon atoms, 1 nitro group, 1 alkylamino group of 2 to 5 carbon atoms or 1 benzoylamino group, or represents a naphthylene radical which contains bonded in the ortho-position relative to the azo group of the radical of the formula (2) an amino group, an alkylaminogroup of 1 to 4 carbon atoms or an optionally (for example by chlorine, alkyl of 1 to 4 carbon atoms, alkoxy of 1 to 4 carbon atoms, sulfo and/or carboxy) substituted phenylamino group or a hydroxy group and which is substituted by no further substituents or is additionally substituted preferably by 1 or 2 sulfo groups or preferably an alkyl group of 1 to 4 carbon atoms, a nitro group, an alkanoylamino group of 2 to 5 carbon atoms, for ex. an acetoylamino group, or an optionally substituted benzoylamino group, of which preferably such as a benzoylamino group and sulfobenzoylamino group, or additionally by 1 to 2 sulfo groups and an alkyl group of 1 to 4 carbon atoms, a nitro group, an alkylamino group of 2 to 5 carbon atoms, such as an acetylamino group, or an optionally substituted benzoylamino group, of which preferably for ex. the benzoylamino and sulfobenzoylamino groups;

K is a 1-hydroxynaphthylene radical which contains bonded in the 2-position the azo group or is a 2-hydroxynaphthylene radical which contains bonded in the 1-position the azo group, which may both be substituted by 1 or 2 sulfo groups or by 1 optionally substituted alkanoylamino group of 2 to 5 carbon atoms or 1 benzoylamino group or by 1 or 2 sulfo groups and 1 optionally substituted alkanoylamino group of 2 to 5 carbon atoms or 1 benzoylamino group, or K is a naphthylene radical which may be, preferably is, substituted by 1 or 2 sulfo groups, or may be substituted by 1 or 2 sulfo groups and an optionally mono-substituted or disubstituted amino group, the substituents of the amino groups belonging to the group of substituents consisting of alkyl of 1 to 4 carbon atoms, hydroxyalkyl of 1 to 4 carbon atoms, carboxyalkyl of 2 to 5 carbon atoms, sulfoalkyl of 1 to 4 carbon atoms, sulfatoalkyl of 1 to 4 carbon atoms, cyanoalkyl of 2 to 5 carbon atoms, carbalkoxyalkyl having alkyl radicals of 1 to 4 carbon atoms each, phenylalkyl having an alkyl radical of 1 to 4 carbon atoms, it being possible for the phenyl radical to be substituted by methyl, ethyl, methoxy, ethoxy, chlorine, sulfo and/or carboxy, phenyl and phenyl which is substituted by alkyl of 1 to 4 carbon atoms, alkoxy of 1 to 4 carbon atoms, chlorine, carboxyl and/or sulfo, or K is a 1-aminonaphthylene radical which contains bonded in the 2-position the azo group or is a 2-aminonaphthylene radical which contains bonded in the 1-position the azo group, it being possible or even preferable for the two aminonaphthylene radicals to be substituted by 1 or 2 sulfo groups or possibly by a hydroxy group in the 5-, 6-, 7- or 8-position or by this hydroxy group and 1 or 2 sulfo groups, or K is a phenylene radical, such as the 1,3- or 1,4-phenylene radical, which may be substituted by 1 or 2 substituents which belong to the group of substituents consisting of 2 alkyl of 1 to 4 carbon atoms, 2 alkoxy of 1 to 4 carbon atoms, 2 chlorine, 1 bromine, 1 alkylamino of 2 to 5 carbon atoms which may be substituted, of these preferably acetylamino, 1 benzoylamino, 1 sulfo, 1 carboxy, 1 ureido, 1 phenylureido, 1 alkylsulfonylamino of 1 to 4 carbon atoms, 1 amino and 1 monosubstituted or disubstituted amino whose substituents are alkyl of 1 to 4 carbon atoms, hydroxyalkyl of 1 to 4 carbon atoms, carboxyalkyl of 2 to 5 carbon atoms, sulfoalkyl of 1 to 4 carbon atoms, sulfatoalkyl of 1 to 4 carbon atoms, cyanoalkyl of 2 to 5 carbon atoms, carbalkoxyalkyl having alkyl radicals of 1 to 4 carbon atoms each, phenylalkyl having an alkyl radical of 1 to 4 carbon atoms whose phenyl radical may be substituted by methyl, ethyl, methoxy, ethoxy, chlorine, carboxy and/or sulfo, phenyl and phenyl which is substituted by alkyl of 1 to 4 carbon atoms, alkoxy of 1 to 4 carbon atoms, chlorine, carboxy and/or sulfo, of which for ex. alkylamino of 1 to 4 carbon atoms, such as methylamino and ethylamino, and N,N-dialkylamino having alkyl groups of 1 to 4 carbon atoms each, such as dimethylamino and diethylamino;

Z is a radical of the general formula (3)

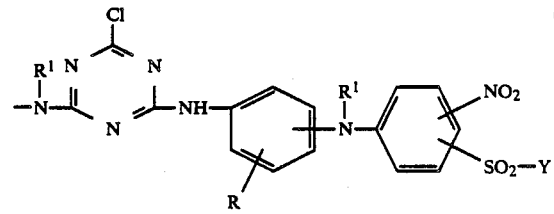

(3)

in which

R$^1$ stands for a hydrogen atom or an optionally substituted alkyl group of 1 to 4 carbon atoms, it being possible for the two R$^1$s to be identical to or different from one another, R denotes a hydrogen atom or a sulfo group and Y the vinyl group or a β-thiosulfatoethyl group, a β-phosphatoethyl group, the β-chloroethyl group or preferably a β-sulfatoethyl group.

Heretofore and hereinafter sulfo groups denote groups conforming to the geneeral formula —SO$_3$M, also carboxy groups groups of the general formula —COOM, phosphato groups groups of the general formula —OPO$_3$M$_2$, thiosulfato groups groups of the general formula —S—SO$_3$M and sulfato groups groups of the general formula —OSO$_3$M.

In the abovementioned groups, M denotes a hydrogen atom or an alkali metal, such as sodium, potassium or lithium, or the equivalent of an alkaline earth metal, such as of calcium; preferably M is a hydrogen atom and in particular an alkali metal.

The azo compounds according to the invention can be present in the form of their free acid and preferably in the form of their salts, in particular neutral salts; salts to be mentioned in particular are the alkali metal salts. The new compounds are preferably in the form of these salts when finding utility for dyeing and printing hydroxy- and/or carboxamide-containing fiber material.

Substitutents in substituted alkanoylamino groups of 2 to 5 carbon atoms are for example chlorine, bromine, sulfo, sulfato, carboxy and hydroxy. Alkyl groups of 1 to 4 carbon atoms which are substituted are for example those which are substituted by 1 to 2, preferably 1, substituent from the group consisting of acetylamino, hydroxy, sulfato, alkoxy of 1 to 4 carbon atoms, sulfo and carboxy.

Preferably the formula residue A is the phenyl radical which may be, preferably is, substituted by 1, 2 or 3, preferably 1 to 2, substituents from the group consisting of alkyl of 1 to 4 carbon atoms, alkoxy of 1 to 4 carbon atoms, chlorine, carboxy and sulfo, preferably at least one of these substituents being a sulfo group. Preferably A is further a naphthyl radical which is substituted by 1, 2 or 3, preferably 1 or 2, sulfo groups. If A represents a radical of the general formula (2), D is preferably the phenyl radical which may be, preferably is, substituted by 1, 2, or 3, preferably 1 or 2, substituents from the group consisting of the alkyl of 1 to 4 carbon atoms, alkoxy of 1 to 4 carbon atoms, chlorine, carboxy and sulfo, preferably at least one of these substituents being a sulfo group, or is a naphthyl radical which is substituted by 1, 2 or 3, preferably 1 or 2, sulfo groups, and the formula member E is preferably a 1-hydroxynaphthylene radical which contains the azo radial D—N=N— bonded in the 2-position and is substituted by 1 or 2 sulfo groups, or is the 1,4-phenylene radical which may be substituted by an amino group, an alkylamino group of 1 to 4 carbon atoms, an alkanoylamino group of 2 to 5 carbon atoms, such as an acetylamino group, a methyl, ethyl, carboxy, sulfo or ureido group or a chlorine atom or by one of these substitutents and by a methyl, ethyl, methoxy, ethoxy or sulfo group or a chlorine atom, or is a 1,4-naphthylene radical which may be substituted by an alkanoylamino group of 2 to 5 carbon atoms or a benzoylamino group and/or 1 or 2 sulfo groups.

Preferably the formula residues R$^1$ are a hydrogen atom or an alkyl group of 1 to 4 carbon atoms, such as in particular the methyl or ethyl group. Preferably, Z is a group of the formula —NH—$Z^2$ mentioned and defined later. Preferably A or D is further a monosulfo or disulfophenyl or a monosulfo, disulfo or trisulfonaphthyl radical or a benzene radical of the general formula (4)

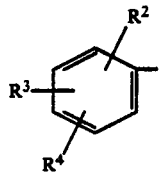

in which $R^2$ denotes a bromine atom, a nitro group or an alkanoylamino group of 2 to 5 carbon atoms, such as the acetylamino group, but preferably a hydrogen atom, an alkyl group of 1 to 4 carbon atoms, such as the ethyl group and in particular the methyl group, an alkoxy group of 1 to 4 carbon atoms, such as the ethoxy group and in particular the methoxy group, a chlorine atom, or a carboxy group, $R^3$ is a bromine atom or a hydroxy group, but preferably a hydrogen atom, an alkyl group of 1 to 4 carbon atoms, such as the ethyl group and in particular the methyl group, an alkoxy group of 1 to 4 carbon atoms, such as the ethoxy group and in particular the methoxy group, a chlorine atom, or a sulfo group and $R^4$ denotes a hydrogen atom or preferably a sulfo group.

The above substitutents $R^2$, $R^3$ and $R^4$ can be identical to or different from one another.

The present invention further concerns processes for preparing the azo compounds of the formula (1). These can be prepared according to the invention by reacting a compound of the general formula (5)

 (5)

(where A, K and $R^1$ have the abovementioned meanings and which can be prepared in a perfectly conventional and known manner of diazotizing and coupling the corresponding components) with a dichlorotriazine compound of the general formula (6)

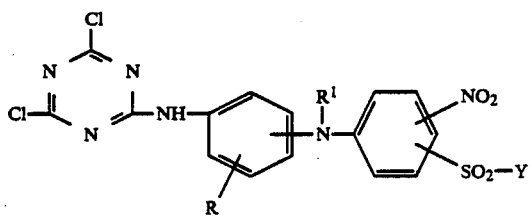 (6)

(in which $R^1$, R and Y have the abovementined meanings) with elimination of one mole of hydrogen chloride, or by reacting a compund of the general formula (7)

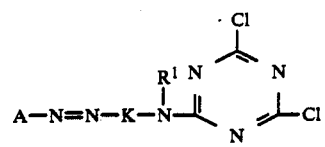 (7)

(where A, K and $R^1$ have the abovementioned meanings and which can be prepared in a perfectly conventional manner by reacting the compound (5) with 2,4,6-trichloro-s-triazine (cyanuric chloride) with an aminodiphenylamine compound of the general formula (8)

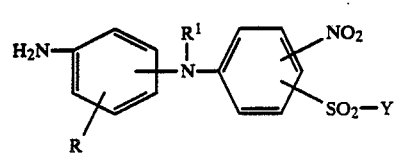 (8)

(in which $R^1$, R and Y have the abovementioned meanings) with elimination of one mole of hydrogen chloride.

The variant of the process of the invention for reacting a compound of the general formula (5) with a compound of the general formula (6) can be carried out in an aqueous organic medium; it is preferably carried out in aqueous solution. The reaction temperature is in general between 0° and 50° C., preferably between 25° and 45° C., in particular between 35° and 40° C. In general, a pH value between 4 and 8, preferably between 5 and 7, is maintained.

The condensation reaction of an aminoazo compound of the general formula (5) with cyanuric chloride to starting compound (7) is in general effected in an aqueous, neutral to acid solution at a temperature between −10° C. and +20° C., preferably at a temperature between 5° and 10° C. and at a pH value of 4 to 6. The condensation reaction according to the invention of the dichlorotriazine azo compound of the general formula (7) with the aminodiphenylamine compound of the general formula (8) is generally effected subsequently, preferably without further isolation of the previously prepared compound (7) from the reaction batch, in an aqueous organic solution, preferably aqueous, neutral to acid solution in general at a temperature between 0° and 50° C., preferably between 10° and 40° C., and preferably at a pH value between 3 and 7, in particular between 5 and 6.

The diazo components conforming to a general formula A—$NH_2$ which serve to prepare the starting compounds of the general formula (5) or (7) are for example compounds of the general formulae (9a) to (9h)

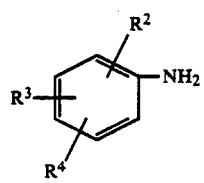 (9a)

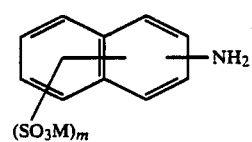 (9b)

-continued

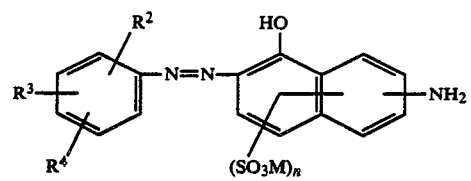 (9c)

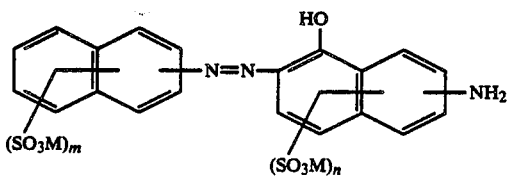 (9d)

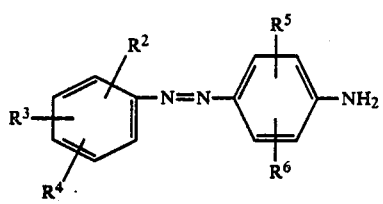 (9e)

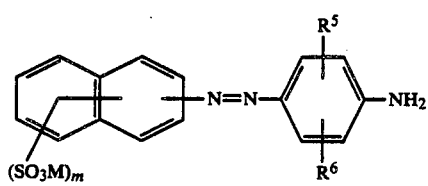 (9f)

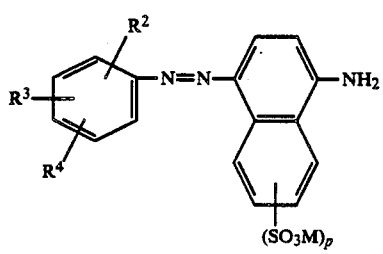 (9g)

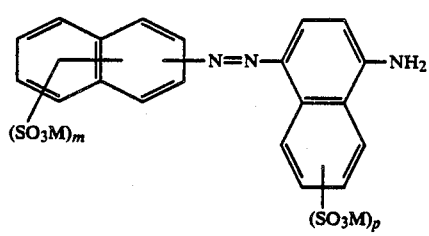 (9h)

in which
M, $R^2$, $R^3$ and $R^4$ have the abovementioned meanings,
m stands for the number 1, 2 or 3,
n denotes number 1 or 2,
p is the number 0, 1 or 2,
$R^5$ is a hydrogen atom, a sulfo group, an alkyl group of 1 to 4 carbon atoms, such as the ethyl group and in particular the methyl group, an alkoxy group of 1 to 4 carbon atoms, such as the ethoxy group and in particular methoxy group, a chlorine atom or a bromine atom,
$R^6$ denotes a hydrogen atom, a sulfo group, an alkyl group of 1 to 4 carbon atoms, such as the ethyl group and in particular methyl group, an alkoxy group of 1 to 4 carbon atoms, such as the ethoxy group and in particular methoxy group, a chlorine atom, a bromine atom, an alkanoylamino group, such as the acetylamino group, the amino group, an alkylamino group of 1 to 4 carbon atoms, a dialkylamino group having alkyl radicals of 1 to 4 carbon atoms each, the ureido group or an alkyl sulfonylamino group of 1 to 4 carbon atoms, and the diazotizable amino group in the formulae (9c) and (9d) is bonded in the 5-, 6- or 7-position of the 1-naphthol radical.

Coupling components of the general formula H—K—NHR$^1$ where K and $R^1$ have the abovementioned meaning, which can serve for preparing the starting compounds of the general formulae (5) and (7), are for example compounds of the general formulae (10a), (10b) and (10c)

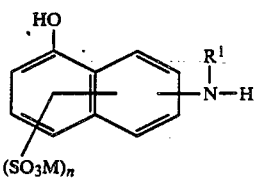 (10a)

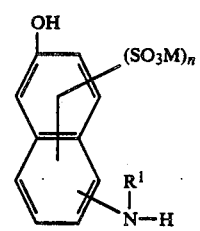 (10b)

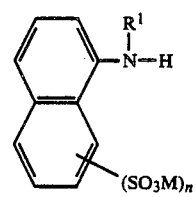 (10c)

in which M, $R^1$ and n have the abovementioned meanings.

Combinations of the abovementioned diazo components conforming to the general formula (9) and the coupling components of the general formula (10) with the radical of the cyanuric chloride and the radical of the aminodiphenylamine of the general formula (8) or with the dichlorotriazinylaminodiphenylamine radical of the general formula (7) give rise to preferred monoazo and disazo compounds of the general formula (1).

The new azo compounds of the general formula (1) can in some instances also be prepared according to the invention by coupling a diazonium compound of an amine of the general formula A—NH$_2$ where A has the abovementioned meaning with a couplable compound of the general formula H—K—Z where K and Z have the abovementioned meaning. The precondition for this is, as is familiar to the person skilled in the art, that the fiber-reactive group Z as an acylamino radical is not bonded in that position of the coupling component H—K—Z which hinders the coupling, such as, for example, not in the 1-position of a naphthalenesulfonic acid. Those suitable coupling components of the formula H—K—Z are for example compounds of the general formulae (11a) to (11e)

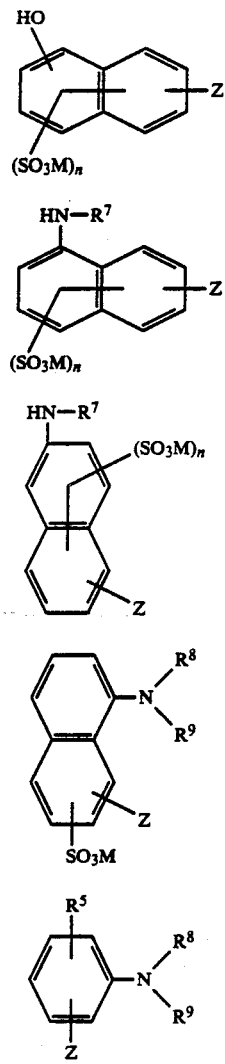

in which

M, Z, R⁵ and n have the abovementioned meanings,

R⁷ stands for a hydrogen atom, an alkyl group of 1 to 4 carbon atoms or a phenyl radical which may be substituted by chlorine, methyl, ethyl, methoxy, ethoxy, sulfo and/or carboxy, R⁸ denotes a hydrogen atom or an alkyl group of 1 to 4 carbon atoms which may be substituted by a hydroxy, carboxy, sulfo, sulfato, carbomethoxy or carbethoxy group, and R⁹ is a hydrogen atom or an alkyl group of 1 to 4 carbon atoms which may be substituted by a hydroxy, cyano, carboxy, sulfo, sulfato, carbomethoxy or carbethoxy group or a phenyl radical, or is a phenyl radical which may be substituted by alkyl of 1 to 4 carbon atoms, alkoxy of 1 to 4 carbon atoms, chlorine and/or sulfo, the radical Z preferably being bonded to formula (11e) in the meta-position relative to the amino group —NR⁸R⁹.

The starting compounds of the general formula (11) can be prepared in a perfectly conventional manner from the aminonaphthalene and aniline compounds in which the amino group is present in place of the formula residue Z in the formula (11), together with cyanuric chloride and the aminodiphenylamine compound of the general formula (8). For instance, the synthesis of the compounds of the general formula H—K—Z is effected by reaction of a compound of the general formula H—K—NHR¹ with a dichlorotriazinylaminodiphenylamine compound of the general formula (6) in an aqueous organic or preferably aqueous medium at a temperature between 25° and 35° C. and at a pH value between 5 and 6.

If the abovementioned condensation reactions between the amino compounds and cyanuric chloride or a dichlorotriazinylamino compound and an amino compound is effected in an aqueous organic medium, the organic solvent in question is preferably acetone, dioxane and dimethylformamide. One of the aminodiphenylamine compounds of the general formula (8) serving as starting compounds is known in the form of its β-hydroxyethylsulfonyl precursor (see German Auslegeschrift No. 1,179,317, Example 5). Other aminodiphenylamine compounds of the formula (8) can easily be prepared analogously via this β-hydroxyethylsulfonyl precursor by means of the corresponding isomeric acylaminoaniline and (β-hydroxyethylsulfonyl)-nitrochlorobenzene compounds. For instance, 4-amino-2'-(β-hydroxyethyl-sulfonyl)-5'-nitrodiphenylamine is obtained by reaction of 1,4-phenylenediamine and 2-chloro-5-nitrophenyl β-hydroxyethyl sulfone in methanolic solution at a temperature between 50° and 70° C. in the course of a few hours, which after cooling down to room temperature and addition of ice-water separates out from the reaction solution in crystals in high yield.

From these β-hydroxyethylsulfonyl-substituted aminodiphenylamine starting compounds the fiber-reactive starting compounds of the general formula (8) can be synthesized in the manner customary for the synthesis of fiber-reactive groups of the vinylsulfonyl series. Preferably they are first converted into their sulfato derivatives by reaction with a sulfating agent analogously to known methods. Sulfating agents are for example 96 to 100% strength of SO₃-containing sulfuric acid or chlorosulfonic acid in an organic solvent, such as pyridine or N-methylpyrrolidone. Analogous sulfating reactions of this kind are known for example from the previously cited German Auslegeschrift No. 1,179,317 and from British Patent Specification No. 1,540,566 and European Patent Application Publication No. 0,036,383. Preferably the sulfation of the β-hydroxyethylsulfonyl starting compound to the corresponding compound of the general formula (8) in which Y stands for the β-sulfatoethyl group is effected in 100% strength sulfuric acid at temperatures between 10° and 30° C. From this, the water-soluble, respectively sulfuric acid-soluble sulfato compound can be isolated after addition of the sulfuric acid solution to ice-water.

The same method can be used to prepare the compounds of the general formula (8) in which Y stands for the β-phosphatoethyl group by reaction with a suitable and customary phosphating agent, such as phosphoric acid, polyphosphoric acid or phosphorus pentachloride.

The β-sulfatoethylsulfonyl compounds of the general formula (8) can be used to prepare the corresponding vinylsulfonyl compounds (where Y is equal to the vinyl group in formula (8)) by reaction with an alkali in aqueous solution, for example by treating a solution of the sulfato compound in alkaline aqueous solution at a pH value between 8 and 10 and at a temperature between about 40° and 60° C. for a short time.

These vinylsulfonyl compounds of the general formula (8) can be used to prepare the corresponding β-thiosulfatoethylsulfonyl compounds by reaction with an alkali metal thiosulfate, for example by reacting the vinylsulfonyl compound of the formula (8) with sodium thiosulfate, advantageously in excess, such as an excess of 21–40% in aqueous weakly acid solution at a temperature between 30° and 80° C.

Aminodiphenylamine starting compounds of the general formula (8) are for example 1-nitro-2-(4'-aminophenylamino)-5-(β-sulfatoethylsulfonyl)-benzene, 1-nitro-4-(4'-aminophenylamino)-5-(β-sulfatoethylsulfonyl)-benzene, 1-nitro-2-(3'-aminophenylamino)-5-(β-sulfatoethylsulfonyl)-benzene, 1-nitro-2-(4'-amino-3'-sulfophenylamino)-5-(β-sulfatoethylsulfonyl)-benzene and 1-nitro-2-(4'-amino-2'-sulfophenylamino)-5-(β-sulfatoethylsulfonyl)-benzene.

Aromatic amines of the general formulae A—NH₂ and D—NH₂, which can serve as diazo components for synthesizing the compounds according to the invention, are for example 1-aminobenzene-2-sulfonic acid, 1-aminobenzene-3- and -4-sulfonic acid, 2-amino-4-sulfobenzenzoic acid, 2-amino-5-sulfobenzoic acid, 4-amino-2-sulfobenzoic acid, 4-aminotoluene-2- and -3-sulfonic acid, 2-aminotoluene-4- and -5-sulfonic acid, 2-aminotoluene-4-carboxylic acid, anthranilic acid, 4-aminobenzoic acid, 2-aminoanisole-4- and -5-sulfonic acid, 4-amino-benzoic acid, 2-aminoanisole-4- and -5-sulfonic acid, 4-aminoanisole-2- and -3-sulfonic acid, 3-chloro-2-amino-3-toluene-5-sulfonic acid, 4-chloro-2-aminotoluene-5-sulfonic acid, 5-chloro-2-aminotoluene-3- and -4-sulfonic acid, 6-chloro-2-aminotoluene-4-sulfonic acid, 6-chloro-3-aminotoluene-4-sulfonic acid, 1-aminobenzene-2,5-disulfonic acid, 1-aminobenzene-2,4- and -3,5-disulfonic acid, 2-aminotoluene-3,5-disulfonic acid, 2-aminotoluene-4,5- and -4,6-disulfonic acid, 4-aminotoluene-2,5-disulfonic acid, 2-aminonaphthaline-1-sulfonic acid, 2-aminonaphthaline-5- and -6-sulfonic acid, 2-aminonaphthaline-7- and -8-sulfonic acid, 1-aminonaphthaline-2-, -3-, -4-, -5-, -6-, -7- and -8-sulfonic acid, 2-aminonaphthaline-4,8-disulfonic acid, 2-aminonaphthaline-6,8-disulfonic acid, 2-aminonaphthaline-1,5- and -1,7-disulfonic acid, 2-aminonaphthaline-5,7-, -3,6-, -3,7- and -4,7-disulfonic acid, 1-aminonaphthaline-2,4-, -2,5-, -3,6-, -3,7-, -3,8-, -4,6-, -4,7-, -4,8-, -5,7- and -6,8-disulfonic acid, 2-aminonaphthaline-3,6,8-trisulfonic acid, 2-aminonaphthaline-4,6,8- and 1,5,7-trisulfonic acid, 1-aminonaphthaline-2,4,7-trisulfonic acid, 1-aminonaphthaline-2,4,8-, -3,5,7-, -3,6,8- and -4,6,8-trisulfonic acid.

Compounds conforming to the general formula H—E—NH₂, which can serve for preparing the disazo compounds according to the invention, are for example aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1,3-di-aminobenzene, 1,3-diamino-4-methyl- or -methoxybenzene, 1,3-diaminobenzene-4-sulfonic acid, 1-aminonaphthaline, 1-aminonaphthaline-6- or -7-sulfonic acid, 3-acetylaminoaniline, 2-amino-8-naphthol-6-sulfonic acid, 2-amino-8-naphthol-4,6-disulfonic acid, 2-amino-5-naphthol-7sulfonic acid, 3-amino-5-naphthol-7-sulfonic acid, 1-amino-5-naphthol-7-sulfonic acid, 1-aminonaphthaline-8-sulfonic acid, 2-methylaniline, 2-methoxyaniline, 3-benzoylaminoaniline, 2,3-dimethylaniline, 3,5-dimethylaniline, 1-amino-2-methoxy-5-acetylaminobenzene, 1-amino-2-methoxy-5-acetylaminobenzene.

Further starting compounds which conform to the general formula H—K—NHR¹ are for example aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1,3-diaminobenzene, 1,3-diamino-4-methyl- or -methoxybenzene, 1,3-diaminobenzene-4-sulfonic acid, 1-aminonaphthaline, 1-aminonaphthaline-6- or -7-sulfonic acid, 3-acetylaminoaniline, 2-amino-8-naphthol-6-sulfonic acid, 2-amino-8-naphthol-4,6-disulfonic acid, 2-amino-5-naphthol-7-sulfonic acid, 3-amino-5-naphthol-7-sulfonic acid, 1-amino-5-naphthol-7-sulfonic acid, 1-aminonaphthaline-8-sulfonic acid, 1-amino-8-naphthol-3,6-disulfonic acid, 1-amino-8-naphthol-4,6-disulfonic acid, 2-methylaniline, 2-methoxyaniline, 3-benzoylaminoaniline, 2,3-dimethylaniline, 3,5-dimethylaniline, 1-amino-2-methoxy-5-acetylaminobenzene, 3-amino-N,N-dimethylaniline, 3-amino-N,N-diethylaniline, 3-amino-N,N-di-(β-sulfoethyl)-aniline, 3-amino-N-methyl-N-(β-sulfoethyl)-aniline, N-methylaniline, 3-chloro-N-methylaniline, N-(β-cyanoethyl)-aniiline and N-ethylaniline.

Coupling components which according to the invention can serve for preparing the azo compounds of the general formula (1) and which conform to the general formula H—K—Z are for example the following aminonaphtholsulfonic acids to whose (one) amino or methylamino group is bonded the fiber-reactive radical Z¹ of the general formula (3a)

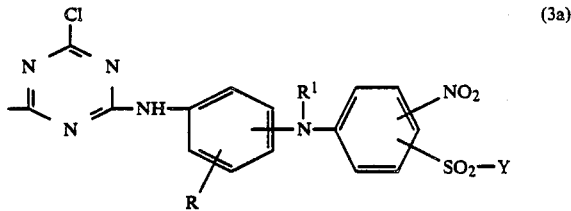

in which R, R¹ and Y have the abovementioned meanings: 1-amino-3,6-disulfo-8-naphthol, 1-amino-4,6-disulfo-8-naphthol, 2-amino-3,6-disulfo-8-naphthol, 3-amino-6-sulfo-8-naphthol, 3-amino-4,6-disulfo-8-naphthol, 3-methylamino-6-sulfo-8-naphthol, 1-amino-7-sulfo-5-naphthol, 2-amino-6-sulfo-8-naphthol, 1-amino-4-sulfo-8-naphthol, 2-methylamino-6-sulfo-8-naphthol, 2-amino-5-naphthol-7-sulfonic acid, 1-amino-2,4-disulfo-8-naphthol.

Of the azo compounds according to the invention of the general formula (1), emphasis can be given in particular to those groups of compounds which conform to the general formulae (12), (13), (14), (15), (16), (17):

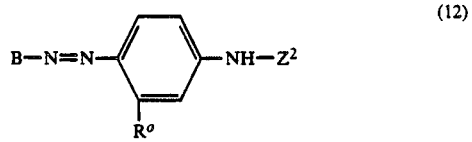

(12)

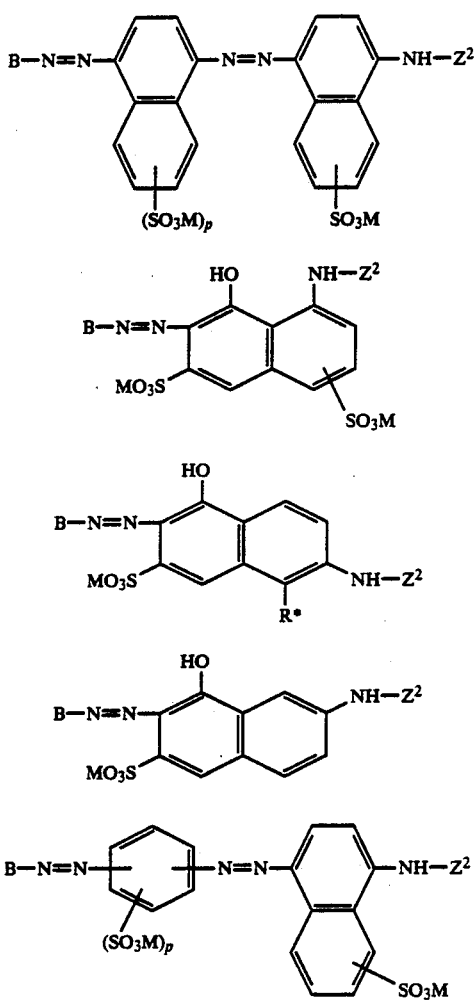

In these formulae the symbols have the following meanings:

M has the abovementioned meaning;

$Z^2$ is a radical of the general formula (3b)

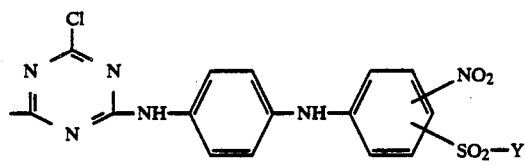

in which

Y has the abovementioned meaning and the group —$SO_2$—Y and the nitro group are bonded to the benzene ring in meta-position relative to each other, but the two are not simultaneously in orthoposition relative to the amino group;

B is a monosulfophenyl, a disulfophenyl, a monosulfo-2-naphthyl, a disulfo-2-naphthyl or a trisulfo-2-naphthyl radical or a radical of the abovementioned and defined general formula (4);

p is the number zero, 1 or 2;

R* is a hydrogen atom or a sulfo group;

R° is a hydrogen atom, a chlorine or bromine atom, an amino group, an alkanoylamino group of 2 to 5 carbon atoms, such as the acetylamino group, a sulfo, carboxyl, methyl, ethyl, methoxy or ureido group.

Particularly preferably in these compounds the formula residue Y is a β-sulfatoethyl group.

Of the compounds of the formula (12), emphasis is to be given in particular to those in which R° stands for the amino group, the acetylamino, sulfo, methoxy, methyl or ureido group.

Of the compounds of the general formula (14), preference is given in particular to those in which the sulfo group or one of the sulfo groups in the formula residue B is bonded to the benzene or naphthalene ring in orthoposition relative to the azo group.

In the compounds of the general formula (13), p is preferably the number 1 or 2.

The precipitation and isolation of the compounds of the general formula (1) prepared according to the invention from the synthesis solutions can be effected by commonly known methods, as for example either by precipitating from the reaction medium by means of electrolytes, such as, for example, sodium chloride or potassium chloride, or by evaporating the reaction solution, for example spray-drying, it being possible to add a buffer substance to this reaction solution.

The compounds according to the invention of the general formula (1) have fiber-reactive properties and possess very good dyestuff properties. They can therefore be used for dyeing (including printing) hydroxy- and /or carboxamide-containing materials. It is also possible to use the solutions, obtained in the synthesis of the compounds according to the invention, directly as a liquid composition, where appropriate after addition of a buffer substance and where appropriate also after concentration, in the dyeing procedures.

The present invention therefore also relates to the use of the compounds according to the invention of the formula (1) for coloring (including printing) hydroxy- and/or carboxamide-containing materials, or to processes for their application to these substrates. This includes mass coloration, such as, for example, of polyamide-films. The materials are preferably dyed in the form of fiber materials, in particular in the form of textile fibers, such as yarns, wound packages and fabrics. Herein it is possible to proceed analogously to known ways of processing.

Hydroxy-containing materials are those of natural or synthetic origin, such as, for example, cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose rayon and filament viscose rayon.

Carboxamide-containing materials are for example synthetic and natural polyamides and polyurethanes, in particular in the form of fibers, for example wool and other animal hairs, silk, leather, polyamide-66, polyamide-6, polyamide-11 and polyamide-4.

The compounds according to the invention of the formula (1) can be applied and fixed, in accordance with the instant invention, on the substrates mentioned, in particular on the fiber materials mentioned, using the application techniques known for water-soluble dyes, in particular fiber-reactive dyes, for example by putting the azo compound of the general formula (1) in dissolved form onto or into the substrate and fixing it thereon or therein, where appropriate through the agency of heat and/or where appropriate through the agency of an alkaline agent. Such ways of dyeing and fixing are numerously described in the literature.

Thus they produce on the cellulose fibers by the exhaust methods from long liquor using various acid-binding agents and where appropriate neutral salts, such as sodium chloride or sodium sulfate, very good color yields and an excellent color buildup. Dyeing is preferably carried out in an aqueous bath at temperatures between 40° and 105° C., where appropriate at temperatures up to 130° C. under pressure, and where appropriate in the presence of customary dyeing auxiliaries. A possible procedure is to introduce the material into the warm bath and gradually to raise the latter to the desired dyeing temperature and to complete the dyeing process at that temperature. The neutral salts which speed up the exhaustion of the dye can if desired also be added to the bath not until the actual dyeing temperature is reached.

The padding processes likewise produce in cellulose fibers good color yields and a good color build-up, customary fixing options being dwelling at room temperature or elevated temperature, for example up to about 60° C., steaming or dry heat.

The customary printing methods for cellulose fibers, which can be carried out in one step, for example by printing with a print paste containing the compound according to the invention and sodium bicarbonate or some other acid-binding agent and subsequent steaming at 100° to 103° C., or in two steps, for example by printing with a neutral or weakly acid print paste which contains a compound according to the invention and subsequent fixing of the compound according to the invention either by passing the printed material through a hot alkali- and electrolyte-containing bath or by overpadding with an alkaline electrolyte-containing padding liquor and subsequent dwelling of this overpadded material or steaming or treatment with dry heat, likewise produce strong prints having well defined outlines and a clear white ground. The outcome of the prints depends only little on varying fixing conditions. Both in dyeng and printing the degrees of fixation obtained with the compounds according to the invention are very high.

Fixing by means of dry heat in the customary thermofixing processes employs hot air at 120° to 200° C. When fixing by means of steam it is possible to use in addition to customary steam at 101° to 103° C. also superheated steam and high-pressure steam at temperatures up to 160° C.

The acid-binding agents which effect fixation of the compound of the formula (1) on the cellulose fibers are for example water-soluble basic salts of alkali metals and alkaline earth metals of organic or inorganic acids or compounds which liberate alkali in the heat. There may be mentioned in particular the alkali metal hydroxides and alkali metal salts of weak to medium organic or inorganic acids, preferably their sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass and trisodium phosphate.

By treating the compounds according to the invention (dyes) with the acid-binding agents, where appropriate under the agency of heat, the former are bonded chemically to the cellulose fiber; in particular the cellulose dyeings display, after the customary aftertreatment by rinsing to remove unfixed dye portions, excellent wet-fastness properties, in particular since unfixed dye portions are readily washed off on account of their high solubility in cold water.

The dyeings and prints prepared with the compounds according to the invention (dyes) on cellulose materials possess a high tinctorial strength, good light fastness properties and good to very good wet fastness properties, such as, for example, good to very good wash fastness properties at 60° to 95° C., even in the presence of perborates, acid and alkaline fulling, cross-dyeing and perspiration fastness properties, good to very good acid and alkaline perspiration fastness properties, a high steam resistance, good to very good alkali, acid, water and seawater fastness properties, and also a good pleating fastness, hot press fastness and rub fastness. They also have a very good resistance to acid fading on storing moist dyed materials still containing acetic acid (compare German Auslegeschrift No. 2,322,236).

Particularly noteworthy are the good wet light fastness properties of cellulose fiber material dyeings and prints moistened with distilled water or tap water and their alkaline perspiration light fastness. In this respect the dyes according to the invention are surprisingly superior to the known and structurally most comparable fiber-reactive dyes mentioned at the beginning, which contain as a reactive group likewise a monochlorotriazinyl radical and a fiber-reactive group of the vinylsulfonyl series.

Dyeing on polyurethane fibers or natural or synthetic polyamide fibers is customarily carried out from an acid medium. It is thus possible for example to add to the dyebath acetic acid and/or ammonium sulfate, sodium acetate and/or ammonium acetate, in order to obtain the desired pH value. To obtain an acceptable levelness of the dyeing, it is advisable to add customary leveling auxiliaries, based, for example, on a reaction product of cyanuric chloride with three times the molar amount of an aminobenzenesulfonic acid and/or of an aminonaphthalenesulfonic acid or based on a reaction product of for example stearylamine with ethylene oxide. As a rule, the material to be dyed is entered into the bath at a temperature of about 40° C., is agitated therein for some time, the dyebath is then adjusted to the desired weakly acid, the preferably weakly acetic acid, pH value, and the actualy dyeing is carried out at a temperature between 60° and 98° C. But the dyeing can also be carried out at the boil or at temperatures up to 120° C. (under pressure).

The process of dyeing wool is herein effected in conventional and known manner by subjecting a fiber-reactive compound of the general formula (1) to the exhaustion process under control of the pH value, preferably first from an acid dyebath having a pH of about 3.5 to 5.5, and toward the end of the dyeing time shifting the pH value into the neutral and where appropriate weaky alkali range up to a pH value of 8.5, in order to bring about the full reactive bond between this dye of the formula (1) and the fiber, in particular when high depths of shade are to be obtained. At the same time the portion of the dye which is not reactively bonded is dissolved off.

The method of processing described here is also applicable to preparing dyeings on fiber materials made of other natural polyamides or of synthetic polyamides and polyurethanes. The dyeings are carried out at temperatures of 60° to 100° C., but they can also be effected in sealed dyeing apparatus at temperatures up to 106° C.

Since the compounds of the general formula (1) are very readily water-soluble, they can advantageously also be used in conventional continuous dyeing processes. The tinctorial strength of the compounds according to the invention of the general formula (1) is very high. They produce on the fiber materials, in particular in the reactive dyeing of wool, strong, fast dyeings. On using dyeing temperatures of 100° to 106° C. the bath exhaustion is found to be high.

With the dyeings obtainable with the compounds according to the invention of the general formula (1) it is possible to dispense with an otherwise customary ammoniacal aftertreatment of the dyed material. Compared with structurally similar known dyes, they surprisingly have a very good color buildup where the brilliant hue is retained in deep shades. They are moreover highly compatible with other fiber-reactive wool dyes which permit a surprisingly level dyeing of the fiber. Similarly, material made of wool fibers of different provenances can be dyed level with the compound according to the invention. To improve the leveling behavior it is possible where appropriate to add a customary leveling auxiliary, such as, for example, N-methyltaurine.

The examples below serve to illustrate the invention. The parts and percentages are by weight, unless otherwise stated. Parts by weight relate to parts by volume as the kilogram relates to the liter.

The compounds described in terms of formulae in these examples are shown in the form of the free acids; they are generally prepared and isolated in the form of their sodium or potassium salts and used for dyeing in the form of their salts. The starting compounds and components mentioned in the examples below, in particular the tabled examples, in the form of a free acid can likewise be used in the synthesis as such or in the form of their salts, preferably alkali metal salts, such as sodium or potassium salts.

EXAMPLE 1

(a) A solution having a pH value between 4.5 and 5.0 and a temperature between 5° and 10° C. of 62 parts of 1-amino-3,6-disulfo-8-naphthol in 600 parts of water is mixed with stirring by adding 36 parts of cyanuric chloride portionwise; the pH is held at 2.0 with sodium hydrogencarbonate. Stirring of the batch is continued for an additional 4 hours at a temperature between 5° and 10° C. and a pH value of 2.

(b) A suspension of 32 parts of aniline-2-sulfonic acid in 500 parts of ice-water has added to it 45 parts of concentrated aqueous hydrochloric acid; the diazotization is effected by addition of 40 parts by volume of aqueous 5N sodium nitrite solution. Stirring is continued at about 5° C. for a further four hours, and excess nitrous acid is destroyed in conventional manner by means of amidosulfonic acid.

(c) The diazonium salt solution prepared in (b) is gradually added with stirring to the solution of the coupling component prepared in (a) while the pH value is held between 5.0 and 6.0. To obtain complete coupling, stirring is continued for a further 6 hours at a pH value of 6.

(d) The solution of the azo compound of (c) has added to it with stirring 84 parts of 1-nitro-2-(4'-aminophenylamino)-5-(β-sulfatoethylsulfonyl)-benzene; the pH value is held between 5.5 and 6.0 and the temperature at 25° C. The batch is stirred for a further 8 hours, and the resulting compound according to the invention is salted out with sodium chloride and isolated by filtration; the compound according to the invention can also be isolated by evaporating to dryness or spray-drying.

The result obtained is a red, electrolyte-containing powder which contains the sodium salt of the azo compound of the formula

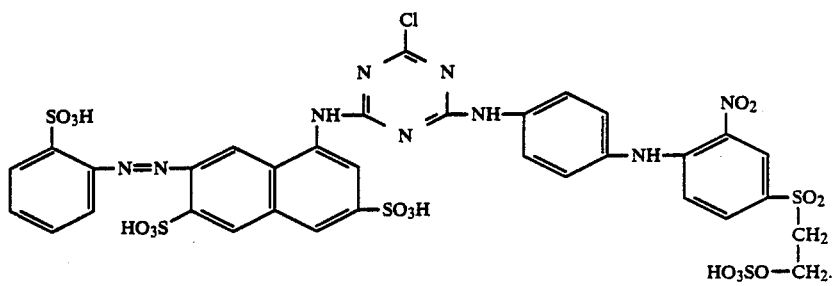

The compound according to the invention has very good dyestuff properties and in aqueous solution an absorption peak at 510 nm. It dyes fiber materials mentioned in the description by the dyeing and printing methods customary in the industry, in particular cellulose fiber materials via the application and fixing methods for fiber-reactive dyes, in yellowish red shades. In particular on cellulose fiber materials the dyeings obtained have very good wet fastness properties, of which in particular the good was fastness properties and the good wet light fastness properties, such as in particular a good alkaline perspiration light fastness, as well as the good chlorinated water fastness properties can be emphasized.

EXAMPLES 2 to 17

The tabled examples below describe further azo compounds according to the invention conforming to a general formula

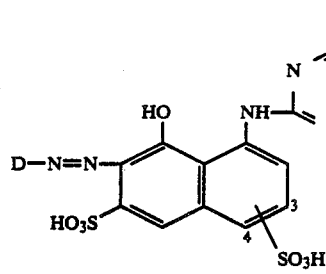
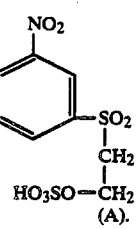

(A)

They can be prepared in a manner according to the invention, for example analogoulsy to the above Example 1, from the components visible in this formula (such as the diazonium compound of the aromatic amine, the aminonaphtholsulfonic acid, cyanuric chloride and 1-nitro-2-(4'-aminophenylamino)-5-(β-sulfatoethylsulfonyl)-benzene). They have very good fiber-reactive dyestuff properties and produce on the materials mentioned in the description, such as in particular cellulose fiber materials, via the application methods customary in the industry, preferably by the application and fixing methods customary for fiber-reactive dyes, strong dyeings and prints having good fastness properties, such as, for example, the fastness properties indicated in Example 1, in the hue on cotton specified in the respective tabled example.

Azo compound conforming to the formula (A)

| Sample | Aromatic amine D-NH$_2$ | Position of the sulfo group | Hue |
|---|---|---|---|
| 2 | aniline-3-sulfonic acid | 3- | red |
| 3 | aniline-4-sulfonic acid | 3- | red |
| 4 | aniline-2,5-disulfonic acid | 3- | red |
| 5 | aniline-4-methyl-2-sulfonic acid | 3- | red |
| 6 | aniline-4-chloro-2-sulfonic acid | 3- | red |
| 7 | 2-naphthylamine-1,5-disulfonic acid | 3- | red |
| 8 | 2-naphthylamine-1-sulfonic acid | 3- | red |
| 9 | 2-naphthylamine-4,8-disulfonic acid | 3- | red |
| 10 | 2-naphthylamine-3,6,8-trisulfonic acid | 3- | red |
| 11 | aniline-2-carboxylic acid | 3- | red |
| 12 | aniline-4-methoxy-2-sulfonic acid | 3- | red |
| 13 | aniline-4-sulfonamide | 3- | red |
| 14 | aniline-2-sulfonic acid | 4- | red |
| 15 | aniline-4-sulfonic acid | 4- | red |
| 16 | aniline-2,5-disulfonic acid | 4- | red |
| 17 | 2-naphthylamine-1,5-disulfonic acid | 4- | red |

EXAMPLE 18

To prepare an azo compound according to the invention the directions of Example 1 are followed, except that in process section (d) the 1-nitro-2-(4'-aminophenylamino)-5-(β-sulfatoethylsulfonyl)-benzene is replaced by an equivalent amount of 1-nitro-4-(4'-aminophenylamino)-5-(β-sulfatoethylsulfonyl)-benzene.

The result obtained is an electrolyte-containing red powder of the sodium salt of the compound of the formula

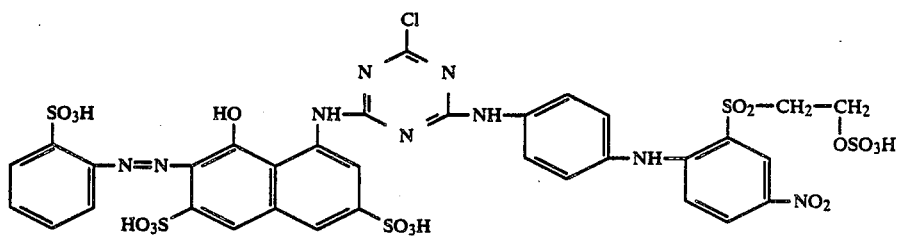

which in aqueous solution has an absorption peak at 508 nm and very good fiber-reactive dyestuff properties. It produces by the application and fixing methods customary in the industry for fiber-reactive dyes on the fiber materials mentioned in the description, in particular cellulose fiber materials, such as cotton, fast and strong red dyeings and prints; of the fastness properties, in particular the alkaline perspiration light fastness, is noteworthy.

EXAMPLES 19 to 52

The tabled examples below describe further azo compounds according to the invention conforming to general formula (B)

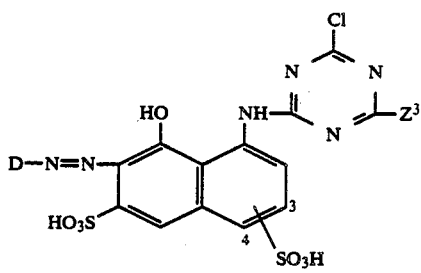

in which D corresponds to the radical of the aromatic amine D-NH$_2$ of the diazo component and $Z^3$ to the amino radical of the aminonitrodiphenylamine of the general formula (8) mentioned in the description. They can be prepared in a manner according to the invention, for example analogously to the above Example 1, from the components visible in the formula (such as the diazonium compound of the aromatic amine, the aminonaphtholsulfonic acid, cyanuric chloride and the aminonitrodiphenylamine compound H-$Z^3$ conforming to the general formula (8)). They have very good fiber-reactive dyestuff properties and produce on the materials mentioned in the description, such as in particular cellulose fiber materials, by the application methods customary in the industry, preferably by the application and fixing methods customary for fiber-reactive dyestuffs, strong dyeings and prints having good fastness properties, such as for example the fastness properties indicated in Example 1, in the hue on cotton specified in the respective tabled example.

| | | Azo compound conforming to the formula (B) | | |
|---|---|---|---|---|
| Example | Aromatic amine D-NH$_2$ | Position of the sulfo group | Aminodiphenylamine H—Z$^3$ conforming to the formula (8) | Hue |
| 19 | aniline-3-sulfonic acid | 3- | 1-nitro-4-(4'-aminophenylamino)-5-($\beta$-sulfatoethylsulfonyl)-benzene | red |
| 20 | aniline-4-sulfonic acid | 3- | 1-nitro-4-(4'-aminophenylamino)-5-($\beta$-sulfatoethylsulfonyl)-benzene | red |
| 21 | aniline-2,5-disulfonic acid | 3- | 1-nitro-4-(4'-aminophenylamino)-5-($\beta$-sulfatoethylsulfonyl)-benzene | red |
| 22 | aniline-4-methyl-2-sulfonic acid | 3- | 1-nitro-4-(4'-aminophenylamino)-5-($\beta$-sulfatoethylsulfonyl)-benzene | red |
| 23 | aniline-4-chloro-2-sulfonic acid | 3- | 1-nitro-4-(4'-aminophenylamino)-5-($\beta$-sulfatoethylsulfonyl-benzene | red |
| 24 | 2-naphthylamine-1,5-disulfonic acid | 3- | 1-nitro-4-(4'-aminophenylamino)-5-($\beta$-sulfatoethylsulfonyl-benzene | red |
| 25 | 2-naphythylamine-4,8-disulfonic acid | 3- | 1-nitro-4-(4'-aminophenylamino)-5-($\beta$-sulfatoethylsulfonyl-benzene | red |
| 26 | 2-naphthylamine-3,6,8-trisulfonic acid | 3- | 1-nitro-4-(4'-aminophenylamino)-5-($\beta$-sulfatoethylsulfonyl-benzene | red |
| 27 | aniline-4-sulfonamide | 3- | 1-nitro-4-(4'-aminophenylamino)-5-($\beta$-sulfatoethylsulfonyl-benzene | red |
| 28 | aniline-2-sulfonic acid | 4- | 1-nitro-4-(4'-aminophenylamino)-5-($\beta$-sulfatoethylsulfonyl-benzene | red |
| 29 | aniline-4-sulfonic acid | 4- | 1-nitro-4-(4'-aminophenylamino)-5-($\beta$-sulfatoethylsulfonyl-benzene | red |
| 30 | aniline-2,5-disulfonic acid | 4- | 1-nitro-4-(4'-aminophenylamino)-5-($\beta$-sulfatoethylsulfonyl-benzene | red |
| 31 | 2-naphthylamine-1,5-disulfonic acid | 4- | 1-nitro-4-(4'-aminophenylamino)-5-($\beta$-sulfatoethylsulfonyl-benzene | red |
| 32 | aniline-2-sulfonic acid | 4- | 1-nitro-2-(3'-aminophenylamino)-5-($\beta$-sulfatoethylsulfonyl)-benzene | red |
| 33 | 2-naphthylamine-1,5-disulfonic acid | 4- | 1-nitro-2-(3'-aminophenylamino)-5-($\beta$-sulfatoethylsulfonyl)-benzene | red |
| 34 | aniline-2-sulfonic acid | 3- | 1-nitro-2-(3'-aminophenylamino)-5-($\beta$-sulfatoethylsulfonyl)-benzene | red |
| 35 | 2-naphthylamine-1,5-disulfonic acid | 3- | 1-nitro-2-(3'-aminophenylamino)-5-($\beta$-sulfatoethylsulfonyl)-benzene | red |
| 36 | aniline-2-sulfonic acid | 3- | 1-nitro-4-(3'-aminophenylamino)-5-($\beta$-sulfatoethylsulfonyl)-benzene | red |
| 37 | 2-naphythylamine-1,5-disulfonic acid | 3- | 1-nitro-4-(3'-aminophenylamino)-5-($\beta$-sulfatoethylsulfonyl)-benzene | red |
| 38 | aniline-2-sulfonic acid | 3- | 1-nitro-2-(4'-aminophenylamino)-5-($\beta$-phosphatoethylsulfonyl)-benzene | red |
| 39 | " | 3- | 1-nitro-2-(4'-aminophenylamino)-5-vinylsulfonylbenzene | red |
| 40 | " | 3- | 1-nitro-2-(4'-aminophenylamino)-5-($\beta$-thiosulfatoethylsulfonyl)-benzene | red |
| 41 | " | 3- | 1-nitro-2-(4'-aminophenylamino)-5-($\beta$-chloroethylsulfonyl-benzene | red |
| 42 | " | 3- | 1-nitro-4-(4'-aminophenylamino)-5-($\beta$-thiosulfatoethylsulfonyl)-benzene | red |
| 43 | " | 3- | 1-nitro-2-(3'-aminophenylamino)-5-vinylsulfonylbenzene | red |
| 44 | aniline-2-sulfonic acid | 3- | 1-nitro-2-(3'-aminophenylmethylamino)-5-$\beta$-(sulfatoethylsulfonyl)-benzene | red |
| 45 | " | 3- | 1-nitro-2-(3'-aminophenylmethylamino-5-($\beta$-thiosulfatoethylsulfonyl)-benzene | red |
| 46 | " | 3- | 1-nitro-4-(4'-aminophenylmethylamino)-5-($\beta$-thiosulfatoethylsulfonyl)-benzene | red |
| 47 | aniline-2,5-disulfonic acid | 3- | 1-nitro-2-(4'-aminophenylmethylamino)-5-($\beta$-thiosulfatoethylsulfonyl)-benzene | red |
| 48 | aniline-2-sulfonic acid | 3- | 1-nitro-2-(4'-amino-3'-sulfophenylamino)-5-($\beta$-sulfatoethylsulfonyl)-benzene | red |
| 49 | 2-naphthylamine-1,5-disulfonic acid | 3- | 1-nitro-2-(4'-amino-3'-sulfophenylamino)-5-($\beta$-sulfatoethylsulfonyl)-benzene | red |
| 50 | aniline-2-sulfonic acid | 3- | 1-nitro-2-(4'-amino-2'-sulfophenylamino)-5-($\beta$-sulfatoethyl- | red |

-continued

| Example | Aromatic amine D-NH$_2$ | Position of the sulfo group | Aminodiphenylamine H—Z$^3$ conforming to the formula (8) | Hue |
|---|---|---|---|---|
| 51 | 2-naphthylamine-1,5-disulfonic acid | 3- | 1-nitro-2-(4'-amino-2'-sulfo-phenylamino)-5-($\beta$-sulfatoethyl-sulfonyl)-benzene | red |
| 52 | 2-naphthylamine-4,8-disulfonic acid | 3- | 1-nitro-2-(4'-amino-2'-sulfo-phenylamino)-5-($\beta$-sulfatoethyl-sulfonyl)-benzene | red |

EXAMPLE 53

(a) A solution in 1,000 parts of water of 43.7 parts of an aminoazo compound prepared in conventional manner by coupling 3-amino-6-sulfonaphthol with diazotized 2-sulfo-4-methoxyaniline is gradually mixed by adding, at a temperature between 0° and 5° C. with stirring, a solution of 18 parts of cyanuric chloride in 200 parts by volume of acetone; during the reaction the pH value is held between 5 and 6 by means of dilute aqueous sodium hydroxide solution or dilute aqueous sodium carbonate solution.

(b) The dichlorotriazinylaminoazonaphthol compound prepared in (a) has added to it 41 parts of 1-nitro-2-(4'-aminophenylamino)-5-($\beta$-sulfatoethylsulfonyl)-benzene while holding a pH value between 5 and 6 and gradually raising the reaction temperature to 25° C. Stirring of the batch is continued under these conditions for about a further 6 hours, and the compound according to the invention is subsequently isolated in conventional manner.

The result obtained is an electrolyte-containing red powder of the sodium salt of the compound of the formula

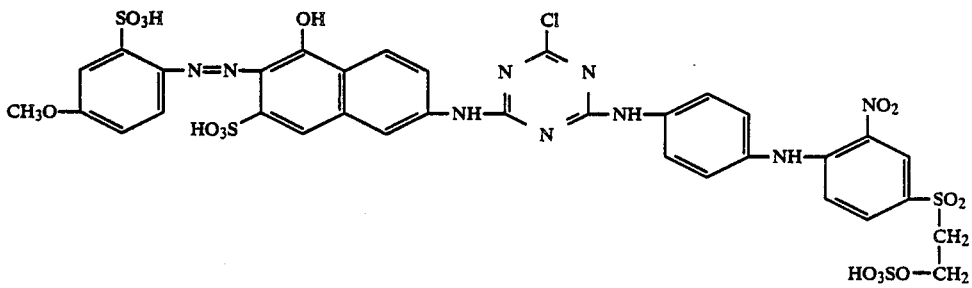

which has very good fiber-reactive dyestuff properties and in aqueous solution an absorption peak at 500 nm and produces by the application and fixing methods customary in the industry on the materials mentioned in the description, in particular on cellulose fiber materials, such as cotton, fast, strong red dyeings and prints. Of the good fastness properties, in particular the good wet-fastness properties, such as good wash, wet light and alkaline perspiration light-fastness properties, are noteworthy.

EXAMPLE 54

(a) 41 parts of 1-nitro-2-(4'-aminophenylamino)-5-($\beta$-sulfatoethylsulfonyl)-benzene are added to a suspension of 18 parts of cyanuric chloride, 100 parts of ice and 300 parts of water and during the reaction the pH value is held at 5.0 by addition of aqueous sodium carbonate solution. The reaction temperature is held at 5° to 8° C. by external cooling. Stirring is continued for about a further 6 hours.

(b) The dichlorotriazinyl compound solution prepared in (a) has added to it with stirring a suspension of 55 parts of an aminoazo dye (from 3-amino-8-naphthol-6-sulfonic acid as coupling component and 1,5-disulfo-2-naphthylamine as diazo component) in 200 parts of water; the reaction temperature is raised to 30° to 40° C. and the pH value is held at 5 to 6 by addition of aqueous sodium carbonate solution. After the condensation reaction has ended, the compound according to the invention is isolated in conventional manner.

The result obtained is a dark-orange, electrolyte-containing powder of the alkali metal salt of the compound of the formula

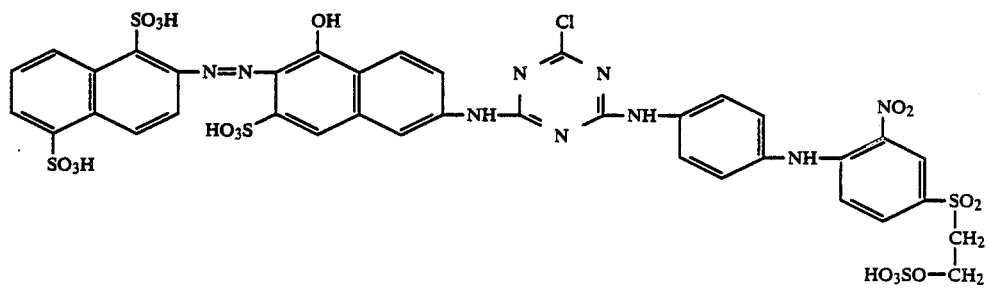

which has very good fiber-reactive dyestuff properties and in aqueous solution an absorption peak at 487 nm and dyes for example cellulose fiber materials, such as cotton, by the application and fixing methods customary in the industry in fast, strong orange shades; of the fastness properties of the obtainable dyeings, in particular the good wash-fastness and the good wet light-fastness properties and the good alkaline perspiration-fastness are noteworthy.

EXAMPLES 55 to 73

The tabled examples below describe further azo compounds according to the invention conforming to a general formula (C)

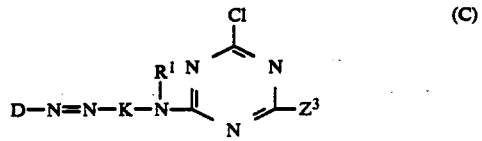

in which D corresponds to the radical of the aromatic amine D-NH$_2$ of the diazo component, —K—N(R$^1$)— to the radical of the coupling component corresponding to the statements given in the description, and Z$^3$ to the amino radical of the aminonitrodiphenylamine of the general formula (B) mentioned in the description. They can be prepared in a manner according to the invention, for example analogously to one of the above examples, from the components visible in the formula (such as the diazonium compound of the aromatic amine, the aminonaphtholsulfonic acid, cyanuric chloride and the aminonitrodiphenylamine compound H—Z$^3$ conforming to the general formula (8)). They have very good fiber-reactive dyestuff properties and produce on the materials mentioned in the description, such as in particular cellulose fiber materials, by the application methods customary in the industry, preferably by the application and fixing methods customary for fiber-reactive dyestuffs, strong dyeings and prints having good fastness properties, such as for example the fastness properties indicated in Example 1, in the hue on cotton indicated in the respective tabled example.

| | Azo compound conforming to the formula (C) | | | |
|---|---|---|---|---|
| Example | Aromatic amine D-NH$_2$ | Coupling comp. H—K—NHR | Aminodiphenylamine H—Z$^3$ | Hue |
| 55 | 2-naphthylamine-1,5,7-trisulfonic acid | 2-amino-5-napthol-7-sulfonic acid | 1-nitro-2-(4'-aminophenyl-amino)-5-($\beta$-sulfatoethyl-sulfonyl)-benzene | orange |
| 56 | 2-naphthylamine-4,6,8-trisulfonic acid | 2-amino-5-napthol-7-sulfonic acid | 1-nitro-2-(4'-aminophenyl-amino)-5-($\beta$-sulfatoethyl-sulfonyl)-benzene | orange |
| 57 | 2-naphthylamine-3,6,8-trisulfonic acid | 2-amino-5-napthol-7-sulfonic acid | 1-nitro-2-(4'-aminophenyl-amino)-5-($\beta$-sulfatoethyl-sulfonyl)-benzene | orange |
| 58 | 2-naphtylamine-6,8-disulfonic acid | 2-amino-5-napthol-7-sulfonic acid | 1-nitro-2-(4'-aminophenyl-amino)-5-($\beta$-sulfatoethyl-sulfonyl)-benzene | orange |
| 59 | aniline-2-sulfonic acid | 2-amino-5-napthol-7-sulfonic acid | 1-nitro-2-(4'-aminophenyl-amino)-5-($\beta$-sulfatoethyl-sulfonyl)-benzene | orange |
| 60 | 4-methoxyaniline-2,5-disulfonic acid | 2-amino-5-napthol-7-sulfonic acid | 1-nitro-2-(4'-aminophenyl-amino)-5-($\beta$-sulfatoethyl-sulfonyl)-benzene | orange |
| 61 | 2-naphthylamine-1,5-disulfonic acid | 2-amino-5-napthol-7-sulfonic acid | 1-nitro-2-(3'-aminophenyl-amino)-5-($\beta$-sulfatoethyl-sulfonyl)-benzene | orange |
| 62 | 2-naphthylamine-1,5-disulfonic acid | 2-amino-5-napthol-7-sulfonic acid | 1-nitro-4-(3'-aminophenyl-amino)-5-($\beta$-sulfatoethyl-sulfonyl)-benzene | orange |
| 63 | 4-methoxyaniline-2-sulfonic acid | 2-amino-5-napthol-7-sulfonic acid | 1-nitro-4-(4'-aminophenyl-amino)-5-($\beta$-sulfatoethyl-sulfonyl)-benzene | orange |
| 64 | 2-naphthylamine-1,5,7-trisulfonic acid | 2-amino-5-napthol-7-sulfonic acid | 1-nitro-4-(4'-aminophenyl-amino)-5-($\beta$-sulfatoethyl-sulfonyl)-benzene | orange |
| 65 | 2-naphthylamine-4,6,8-trisulfonic acid | 2-amino-5-naphthol-7-sulfonic acid | 1-nitro-4-(4'-aminophenyl-amino)-5-($\beta$-sulfatoethyl-sulfonyl)-benzene | orange |
| 66 | 4-methoxy-aniline-2-sulfonic acid | 2-amino-5-naphthol-1,7-disulfonic acid | 1-nitro-4-(4'-aminophenyl-amino)-5-($\beta$-sulfatoethyl-sulfonyl)-benzene | orange |
| 67 | 2-naphthylamine-3,6,8-trisulfonic acid | 2-methylamino-5-naphthol-7-sulfonic acid | 1-nitro-2-(4'-aminophenyl-amino)-5-($\beta$-sulfatoethyl-sulfonyl)-benzene | orange |
| 68 | 2-naphthylamine-3,6,8-trisulfonic acid | 3-amino-5-naphthol-7-sulfonic acid | 1-nitro-2-(4'-aminophenyl-amino)-5-($\beta$-sulfatoethyl-sulfonyl)-benzene | orange |
| 69 | 2-naphthylamine-1,5,7-trisulfonic acid | 3-amino-5-naphthol-7-sulfonic acid | 1-nitro-2-(4'-aminophenyl-amino)-5-($\beta$-sulfatoethyl-sulfonyl)-benzene | orange |
| 70 | 2-naphthylamine-1,5-disulfonic acid | 3-methylamino-5-naphthol-7-sulfonic acid | 1-nitro-2-(4'-aminophehyl-amino)-5-($\beta$-sulfatoethyl-sulfonyl)-benzene | orange |
| 71 | aniline-1,4-disulfonic acid | 3-ureidoaniline | 1-nitro-2-(4'-aminophenyl-amino)-5-($\beta$-sulfatoethyl-sulfonyl)-benzene | golden yellow |
| 72 | 2-naphthylamine-6,8-disulfonic acid | 3-ureidoaniline | 1-nitro-2-(4'-aminophenyl-amino)-5-($\beta$-sulfatoethyl-sulfonyl)-benzene | golden yellow |

-continued

| | Azo compound conforming to the formula (C) | | | |
|---|---|---|---|---|
| Example | Aromatic amine D-NH$_2$ | Coupling comp. H—K—NHR | Aminodiphenylamine H—Z$^3$ | Hue |
| 73 | 2-naphthylamine-3,6,8-trisulfonic acid | 3-acetylamino-6-sulfoaniline | 1-nitro-2-(4'-aminophenyl-amino)-5-($\beta$-sulfatoethyl-sulfonyl)-benzene | golden yellow |

EXAMPLE 74

The conventionally prepared diazonium salt solution comprising 45.7 parts of an aminoazo compound with 1-naphthylamine-2,5,7-trisulfonic acid as diazocomponent and 1-naphthylamine as coupling component in 1,500 parts of water has added to it, as a coupling component, 22 parts of 1-naphthylamine-6-sulfonic acid; the pH is gradually adjusted to a value of 4 with dilute aqueous sodium carbonate solution, stirring is continued for a further 8 hours at 8° to 10° C. and the resulting solution of the aminodisazo compound has gradually added to it a solution of 18 parts of cyanuric chloride in 200 parts by volume of acetone while holding the pH value between 4 and 5 by means of aqueous sodium carbonate solution. After the condensation reaction has ended, the solution of the dichlorotriazinylaminodisazo compound has added to it 42 parts of 1-nitro-2-(4'-aminophenylamino)-5-($\beta$-sulfatoethylsulfonyl)-benzene, the reaction temperature is gradually raised to 40° to 60° C. and the pH value is held between 6 and 6.5 by means of aqueous dilute sodium carbonate solution.

The resulting disazo compound according to the invention is isolated in conventional manner, for example by salting out with sodium chloride. The result obtained is the sodium salt of the compound of the formula

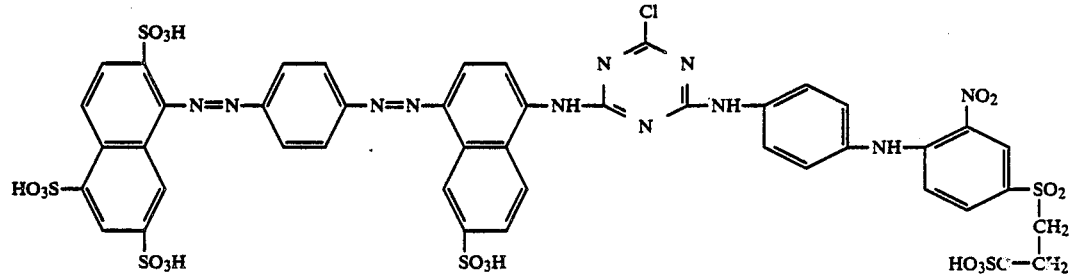

which has very good fiber-reactive dyestuff properties and in aqueous solution an absorption peak at 465 nm and dyes in particular cellulose fiber materials, such as cotton, in strong, fast shades.

EXAMPLE 75

A conventionally prepared aqueous diazonium salt solution of an aminoazo compound from 38.5 parts of an aminoazo-compound of 2,5-disulfoaniline as diazo compound and 1-naphthylamine-6-sulfonic acid as coupling component in 1,500 parts of water has added to it 22 parts of 1-naphthylamine-8-sulfonic acid as coupling component.

Aqueous sodium carbonate solution is used to adjust the pH gradually to a value of 4, and the coupling is completed at that pH value. The resulting aminodiasazo compound is then added to a suspension, prepared analogously to the directions of Example 69(a), of the primary condensation product of cyanuric chloride 1-nitro-2-(4'-amino-phenyl-amino)-5-($\beta$-sulfatoethylsulfonyl)-benzene, and the secondary condensation reaction is carried out at a temperature between 45° and 50° C. and a pH value between 6 and 6.5. After the condensation reaction has ended, the disazo compound according to the invention is isolated in conventional manner as sodium salt. The compound of the formula (written in the form of a free acid)

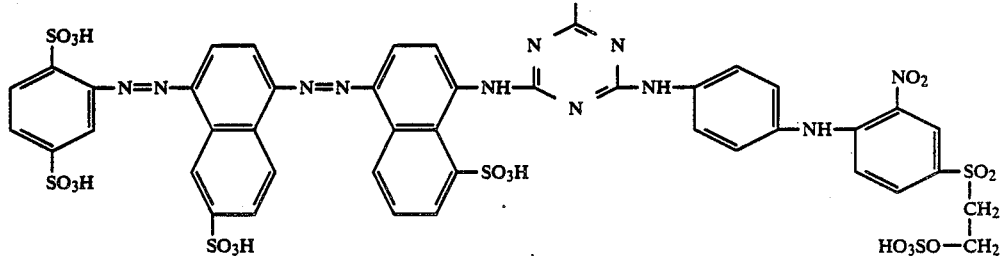

has very good fiber-reactive dyestuff properties and in aqueous solution an absorption peak at 506 nm and dyes in particular cellulose fiber materials, such as cotton, by the application and fixing methods known for fiber-reactive dyestuffs in the industry in fast brown, deep shades.

EXAMPLES 76 TO 96

The tabled Examples below describe further azo compounds according to the invention conforming to the general formula (E)

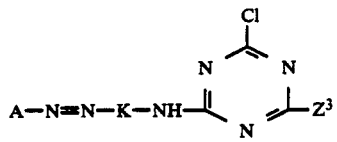

(E)

in which A corresponds to the radical of the aromatic diazotizable aminoazo compound acting as the diazo component, —K—NH— to the radical of a coupling component corresponding to a formula residue K as mentioned in the description, and $Z^3$ to the amino radical of the aminonitrodiphenylamine of the general formula (8) mentioned in the description. They can be prepared in a manner according to the invention, for example analogously to one of the above examples, from the components visible in the formula (such as the diazonium compound of the aromatic aminoazo compound, the aminonaphtholsulfonic acid, cyanuric chloride and the aminonitrodiphenylamine compound H—$Z^3$ in accordance with the general formula (8) mentioned in the description). They have very good fiber-reactive dyestuff properties and produce on the materials mentioned in the description, such as in particular cellulose fiber materials, by the application methods customary in the industry, preferably by the application and fixing methods customary for fiber-reactive dyes, strong dyeings and prints having good fastness properties, such as for example the fastness properties indicated in Example 1, in the hue on cotton indicated in the respective tabled example.

| Example | Aminodisazo compound A-NH$_2$ | Coupling component H—K—NH$_2$ | Aminodiphenylamine H—$Z^3$ | Hue |
|---|---|---|---|---|
| 76 | 4-(2',5',7'-trisulfo-naphthyl-1'-azo)-1-aminonaphthaline | 1-naphthylamine-8-sulfonic acid | 1-nitro-2-(4'-aminophenyl-amino)-5-($\beta$-sulfatoethyl-sulfonyl)-benzene | brown |
| 77 | 4-(2',5',7'-trisulfo-naphthyl-1'-azo)-1-aminonaphthaline | 3-methylaniline | 1-nitro-2-(4'-aminophenyl-amino)-5-($\beta$-sulfatoethyl-sulfonyl)-benzene | brown |
| 78 | 4-(2',5',7'-trisulfo-naphthyl-1'-azo)-1-aminonaphthaline | 1-naphthylamine-8-sulfonic acid | 1-nitro-4-(4'-aminophenyl-amino)-5-($\beta$-sulfatoethyl-sulfonyl)-benzene | brown |
| 79 | 4-(2',4'-disulfo-phenylazo)-2-sulfo-aniline | 1-naphthylamine-6-sulfonic acid | 1-nitro-2-(4'-aminophenyl-amino)-5-($\beta$-sulfatoethyl-sulfonyl)-benzene | yellowish brown |
| 80 | 4-(2',4'-disulfo-phenylazo)-2-sulfo-aniline | 1-naphthylamine-6-sulfonic acid | 1-nitro-2-(4'-aminophenyl-amino)-5-($\beta$-phosphato-ethylsulfonyl)-benzene | yellowish brown |
| 81 | 4-(2',4'-disulfo-phenylazo)-2-sulfo-aniline | 1-naphthylamine-8-sulfonic acid | 1-nitro-2-(4'-aminophenyl-amino)-5-vinylsulfonyl-benzene | yellowish brown |
| 82 | 4-(2',4'-disulfo-phenylazo)-2-sulfo-aniline | 1-naphthylamine-8-sulfonic acid | 1-nitro-4-(4'-aminophenyl-amino)-5-($\beta$-sulfatoethyl-sulfonyl)-benzene | yellowish brown |
| 83 | 4-(4',8'-disulfo-naphthyl-2'-azo)-6-sulfo-1-naphthylamine | 1-naphthylamine-8-sulfonic acid | 1-nitro-4-(4'-aminophenyl-amino)-5-($\beta$-sulfatoethyl-sulfonyl)-benzene | reddish brown |
| 84 | 4-(4',8'-disulfo-naphthyl-2'-azo)-6-sulfo-1-naphthylamine | 1-naphthylamine-8-sulfonic acid | 1-nitro-2-(4'-aminophenyl-amino)-5-($\beta$-sulfatoethyl-sulfonyl)-benzene | reddish brown |
| 85 | 4-(4',8'-disulfo-naphthyl-2'-azo)-6-sulfo-1-naphthylamine | 1-naphthylamine-6-sulfonic acid | 1-nitro-2-(4'-aminophenyl-amino)-5-($\beta$-sulfatoethyl-sulfonyl)-benzene | reddish brown |
| 86 | 4-(4',6',8'-trisulfo-naphthyl-2'-azo)-6-sulfo-1-naphthylamine | 3-methylaniline | 1-nitro-2-(4'-aminophenyl-amino)-5-($\beta$-sulfatoethyl-sulfonyl)-benzene | brown |
| 87 | 4-(4',6',8'-trisulfo-naphthyl-2'-azo)-6-sulfo-1-naphthylamine | 1-naphthylamine-8-sulfonic acid | 1-nitro-2-(4'-aminophenyl-amino)-5-($\beta$-sulfatoethyl-sulfonyl)-benzene | reddish brown |
| 88 | 4-(4',6',8'-trisulfo-naphthyl-2'-azo)-6-sulfo-1-naphthylamine | 1-naphthylamine-6-sulfonic acid | 1-nitro-2-(4'-aminophenyl-amino)-5-($\beta$-sulfatoethyl-sulfonyl)-benzene | reddish brown |
| 89 | 4-(4',6',8'-trisulfo-naphthyl-2'-azo)-6-sulfo-1-naphthylamine | 1-naphthylamine-6-sulfonic acid | 1-nitro-4-(4'-aminophenyl-amino)-5-($\beta$-sulfatoethyl sulfonyl)-benzene | reddish brown |
| 90 | 4-(4',6',8'-trisulfo-naphthyl-2'-azo)-6-sulfo-1-naphthylamine | 1-naphthylamine-8-sulfonic acid | 1-nitro-4-(4'-aminophenyl-amino)-5-($\beta$-sulfatoethyl sulfonyl)-benzene | reddish brown |
| 91 | 4-(4',6',8'-trisulfo-naphthyl-2'-azo)-6-sulfo-1-naphthylamine | 3-methylaniline | 1-nitro-4-(4'-aminophenyl-amino)-5-($\beta$-sulfatoethyl sulfonyl)-benzene | brown |
| 92 | 4-(4',6',8'-trisulfo-naphthyl-2'-azo)-6-sulfo-1-naphthylamine | 1-naphthylamine-8-sulfonic acid | 1-nitro-2-(3'-aminophenyl-amino)-5-($\beta$-sulfatoethyl-sulfonyl)-benzene | reddish brown |
| 93 | 4-(4',6',8'-trisulfo-naphthyl-2'-azo)-6-sulfo-1-naphthylamine | 1-naphthylamine-8-sulfonic acid | 1-nitro-4-(3'-aminophenyl-amino)-5-($\beta$-sulfatoethyl-sulfonyl)-benzene | reddish brown |
| 94 | 4-(2',5',7'-trisulfo-naphthyl-1'-azo)-1-naphthylamine | 1-naphthylamine-8-sulfonic acid | 1-nitro-2-(3'-aminophenyl-amino)-5-($\beta$-sulfatoethyl-sulfonyl)-benzene | reddish brown |
| 95 | 4-(2',5',7'-trisulfo-naphthyl-1'-azo)-6- | 1-naphthylamine-8-sulfonic acid | 1-nitro-2-(4'-aminophenyl-amino)-5-($\beta$-sulfatoethyl- | reddish brown |

| | Azo compound conforming to the formula (E) | | | |
|---|---|---|---|---|
| Example | Aminodisazo compound A-NH₂ | Coupling component H-K-NH₂ | Aminodiphenylamine H-Z³ | Hue |
| 96 | sulfo-1-naphthylamine 4-(2',5',7'-trisulfo-naphthyl-1'-azo)-6-sulfo-1-naphthylamine | 1-naphthylamine-6-sulfonic acid | sulfonyl)-benzene 1-nitro-2-(4'-aminophenyl-amino)-5-(β-sulfatoethyl-sulfonyl)-benzene | reddish brown |

What is claimed is:

1. A water-soluble azo compound of the formula

A—N=N—K—Z in which
- A is phenyl unsubstituted or substituted by substituents selected from the group of substituents consisting of alkyl of 1 to 4 carbon atoms, alkoxy of 1 to 4 carbon atoms, carboxy, alkylamino of 2 to 5 carbon atoms unsubstituted or substituted by substituents selected from chlorine, bromine, sulfo, sulfato, carboxy and hydroxy, benzoylamino, phenylamino, sulfophenylamino, carbamoyl, carbamoyl which is monosubstituted or disubstituted by alkyl of 1 to 4 carbon atoms, sulfamoyl, sulfamoyl which is monosubstituted or disubstituted by alkyl of 1 to 4 carbon atoms, N-phenylsulfamoyl, N-phenyl-N-(C¹-C⁴-alkyl)-sulfamoyl, cyano, nitro, chlorine, bromine, fluorine, trifluoromethyl, hydroxy and sulfo, or
- is a naphthyl unsubstituted or substituted by 1, 2 or 3 substituents selected from the group of substituents consisting of sulfo, carboxy, methyl, ethyl, methoxy, ethoxy, alkanoylamino of 2 to 5 carbon atoms unsubstituted or substituted by substituents selected from chlroine, bromine, sulfo, sulfato, carboxy and hydroxy, benzoylamino, chlorine, hydroxy and nitro, K is a 1-hydroxynaphthylene which contains the azo group bonded in the 2-position, or it a 2-hydroxynaphthylene which contains the azo group bonded in the 1-position, which both are unsubstituted or are substituted by 1 or 2 sulfo groups or by 1 alkanoylamino group of 2 to 5 carbon atoms unsubstituted or substituted by substituents selected from chlorine, bromine, sulfo, sulfato, carboxy and hydroxy, or by 1 benzoylamino group, or are substituted by 1 alkanoylamino group of 2 to 5 carbon atoms unsubstituted or substituted by substituents selected from chlorine, bromine, sulfo, sulfato, carboxy and hydroxy, or 1 benzoylamino group and 1 or 2 sulfo groups, or
- K is a naphthylene unsubstituted or substituted by 1 or 2 sulfo groups, or substituted by 1 to 2 sulfo groups and an unsubstituted or monosubstituted or disubstituted amino group, the substituents on the amino groups belonging to the group of substituents consisting of alkyl of 1 to 4 carbon atoms, hydroxyalkyl of 1 to 4 carbon atoms, carboxylalkyl of 2 to 5 carbon atoms, sulfoalkyl of 1 to 4 carbon atoms, suflatoalkyl of 1 to 4 carbon atoms, cyanoalkyl of 2 to 5 carbon atoms, carbalkoxyalkyl havng alkyl groups of 1 to 4 carbon atoms each, phenylalkyl having an alkyl group of 1 to 4 carbon atoms (in which the phenyl is unsubstituted or substituted by substituents selected from the group consisting of methyl, ethyl, methoxy, ethoxy, chlorine, sulfo and carboxy), phenyl and phenyl substituted by substituents selected from the group consisting of alkyl of 1 to 4 carbon atoms, alkoxy of 1 to 4 carbon atoms, chlorine, carboxy and sulfo, or
- K is a 1-aminonaphthylene which contains the azo group bonded in the 2-position, or is a 2-aminonaphthylene which contains the azo group bonded in the 1-position, where both the aminonaphthylene are unsubstituted or substituted by 1 or 2 sulfo groups or by a hydroxy group in the 5-, 6-, 7- or 8-position or by this hydroxy group and 1 or 2 sulfo groups, or
- K is a phenylene unsubstituted or substituted by 1 or 2 substituents selected from the group consisting of 2 alkyl of 1 to 4 carbon atoms, 2 alkoxy of 1 to 4 carbon atoms, 2 chlorine, 1 bromine, 1 alkanoylamino of 2 to 5 carbon atoms unsubstituted or substituted by substituents selected from chlorine, bromine, sulfo, sulfato, carboxy and hydroxy, 1 benzoylamino, 1 sulfo, 1 carboxy, 1 ureido, 1 phenylureido, 1 alkylsulfonylamino of 1 to 4 carbon atoms, 1 amino and 1 monosubstituted or disubstituted amino whose substituents are selected from the group consisting of alkyl of 1 to 4 carbon atoms, hydroxyalkyl of 1 to 4 carbon atoms, carboxyalkyl of 2 to 5 carbon atoms, sulfoalkyl of 1 to 4 carbon atoms, sulfatoalkyl of 1 to 4 carbons atoms, cyanoalkyl of 2 to 5 carbon atoms, carbalkoxyalkyl having alkyl groups of 1 to 4 carbon atoms each, phenylalkyl having an alkyl group of 1 to 4 carbon atoms (whose phenyl is unsubstituted or substituted by substituents selected from the group consisting of methyl, ethyl, methoxy, ethoxy, chlorine, carboxy and sulfo), phenyl and phenyl substituted by substituents selected from the group consisting of alkyl of 1 to 4 carbon atoms, alkoxy of 1 to 4 carbon atoms, carboxy, chlorine and sulfo;

Z is a group of the formula

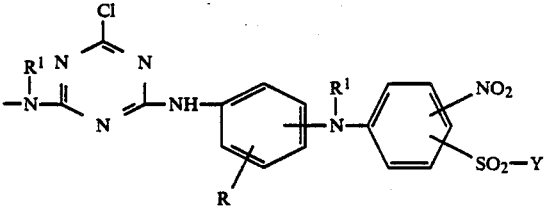

in which
- $R^1$ is hydrogen or an alkyl of 1 to 4 carbon atoms unsubstituted or substituted by 1 or 2 substituents from the group consisting of acetylamino, hydroxy, sulfato, alkoxy of 1 to 4 carbon atoms, sulfo and carboxy, where the two $R^1$ are identical to or different from each other,
- R is hydrogen or sulfo and
- Y is vinyl or β-thiosulfatoethyl, β-phosphatoethyl, β-chloroethyl or β-sulfatoethyl.

2. A compound according to claim 1, wherein A is phenyl substituted by 1 or 2 substituents selected from the group consisting of alkyl of 1 to 4 carbon atoms, alkoxy of 1 to 4 carbon atoms, chlorine, carboxy and sulfo, at least one of these substituents being sulfo, or is naphthyl substituted by 1, 2 or 3 sulfo.

3. A compound according to claim 1, wherein A is monosulfophenyl, disulfophenyl, monosulfonaphthyl, disulfonaphthyl or trisulfonaphthyl or a group of the formula

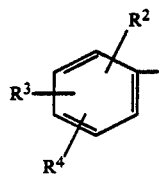

in which
R² is bromine, nitro, alkanoylamino of 2 to 5 carbon atoms, hydrogen, alkyl of 1 to 4 carbon atoms, alkoxy of 1 to 4 carbon atoms, chlorine or carboxy,
R³ is bromine, hydroxy, hydrogen, alkyl of 1 to 4 carbon atoms, alkoxy of 1 to 4 carbon atoms, chlorine or sulfo, and
R⁴ is hydrogen or sulfo.

4. A compound according to claim 1, wherein R¹ is hydrogen, methyl or ethyl.

5. A compound according to claim 1, conforming to the formula

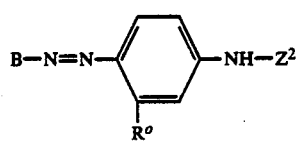

in which
B is monosulfophenyl, disulfophenyl, monosulfo-2-naphthyl, disulfo-2-naphthyl or trisulfo-2-naphthyl or a group of the formula

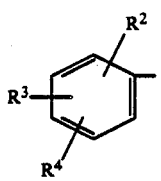

in which
R² is bromine, nitro, alkanoylamino of 2 to 5 carbon atoms, hydrogen, alkyl of 1 to 4 carbon atoms, alkoxy of 1 to 4 carbon atoms, chlorine or carboxy,
R³ is bromine, hydroxy, hydrogen, alkyl of 1 to 4 carbon atoms, alkoxy of 1 to 4 carbon atoms, chlorine or sulfo, and
R⁴ is hydrogen or sulfo,
R⁰ is hydrogen, chlorine, bromine, amino, alkanoylamino of 2 to 5 carbon atoms, sulfo, carboxy, methyl, ethyl, methoxy or ureido, and
Z² is a group of the formula

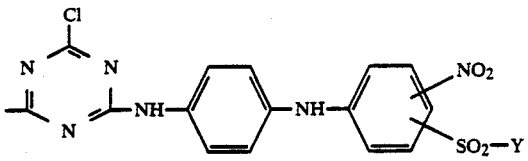

in which Y is vinyl or β-thiosulfatoethyl, β-phosphatoethyl, β-chloroethyl or β-sulfatoethyl, and the group —SO₂—Y and the nitro group are bonded to the benzene ring in the meta-position relative to each other, but both are not simultaneously in the ortho-position relative to the amino group —NH—.

6. A compound according to claim 1, of the formula

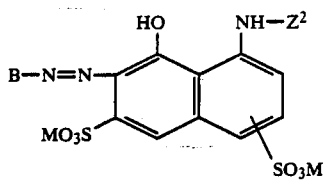

in which
B is monosulfophenyl, disulfophenyl, monosulfo-2-naphthyl, disulfo-2-naphthyl or trisulfo-2-naphthyl or a group of the formula

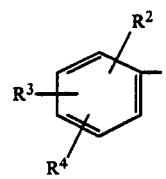

in which
R² is bromine, nitro, alkanoylamino of 2 to 5 carbon atoms, hydrogen, alkyl of 1 to 4 carbon atoms, alkoxy of 1 to 4 carbon atoms, chlorine or carboxy,
R³ is bromine, hydroxy, hydrogen, alkyl of 1 to 4 carbon atoms, alkoxy of 1 to 4 carbon atoms, chlorine or sulfo, and
R⁴ is hydrogen or sulfo,
Z² is a group of the formula

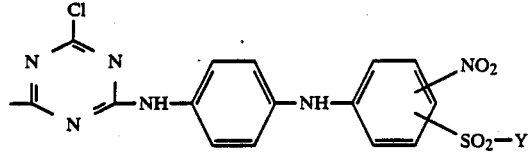

in which Y is vinyl or β-thiosulfatoethyl, β-phosphatoethyl, β-chloroethyl or β-sulfatoethyl, and the group —SO₂—Y and the nitro group are bonded to the benzene ring in the meta-position relative to each other, but both are not simultaneously in the ortho-position relative to the amino group —NH—,
M is hydrogen or an alkali metal.

7. A compound according to claim 1, of the formula

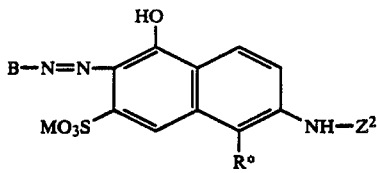

in which

B is monosulfophenyl, disulfophenyl, monosulfo-2-naphthyl, disulfo-2-naphthyl or trisulfo-2-naphthyl or a group of the formula

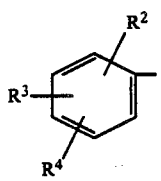

in which $R^2$ is bromine, nitro, alkanoylamino of 2 to 5 carbon atoms, hydrogen, alkyl of 1 to 4 carbon atoms, alkoxy of 1 to 4 carbon atoms, chlorine or carboxy, $R^3$ is bromine, hydroxy, hydrogen, alkyl of 1 to 4 carbon atoms, alkoxy of 1 to 4 carbon atoms, chlorine or sulfo, and $R^4$ is hydrogen or sulfo, $Z^2$ is a group of the formula

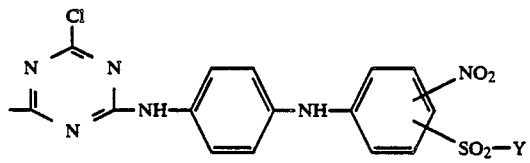

in which Y is vinyl or β-thiosulfatoethyl, β-phosphatoethyl, β-chloroethyl or β-sulfatoethyl, and the group —SO$_2$—Y and the nitro group are bonded to the benzene ring in the meta-position relative to each other, but both are not simultaneously in the ortho-position relative to the amino group —NH—, M is hydrogen or an alkali metal and R* is hydrogen or sulfo.

8. A compound according to claim 1, of the formula

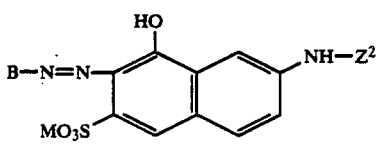

in which

B is monosulfophenyl, disulfophenyl, monosulfo-2-naphthyl, disulfo-2-naphthyl or trisulfo-2-naphthyl or a group of the formula

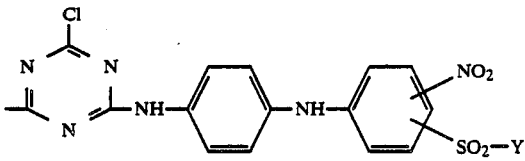

in which $R^2$ is bromine, nitro, alkanoylamino of 2 to 5 carbon atoms, hydrogen, alkyl of 1 to 4 carbon atoms, alkoxy of 1 to 4 carbon atoms, chlorine or carboxy, $R^3$ is bromine, hydroxy, hydrogen, alkyl of 1 to 4 carbon atoms, alkoxy of 1 to 4 carbon atoms, chlorine or sulfo, and $R^4$ is hydrogen or sulfo, $Z^2$ is a group of the formula

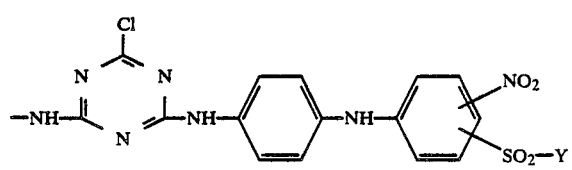

in which Y is vinyl or β-thiosulfatoethyl, β-phosphatoethyl, β-chloroethyl or β-sulfatoethyl, and the group —SO$_2$—Y and the nitro group are bonded to the benzene ring in the meta-position relative to each other, but both are not simultaneously in the ortho-position relative to the amino group —NH—, M is hydrogen or an alkali metal.

9. A compound according to claim 1, wherein Z is a group of the formula

in which Y is vinyl or β-thiosulfatoethyl, β-phosphatoethyl, β-chloroethyl or β-sulfatoethyl, and the group —SO$_2$—Y and the nitro group are bonded to the benzene ring in meta-position relative to each other, but both are not simultaneously in ortho-position relative to the amino group —NH—.

10. A compound according to claim 1, wherein Y is vinyl or β-sulfatoethyl.

11. A water-soluble azo compound of the formula

A—N=N—K—Z in which

K and Z are defined as in claim 1 and

A is a group of the formula

D—N=N—E— in which

D is phenyl unsubstituted or substituted by substituents selected from the group of substituents consisting of alkyl of 1 to 4 carbon atoms, alkoxy of 1 to 4 carbon atoms, carboxy, alkanoylamino of 2 to 5 carbon atoms unsubstituted or substituted by substituents selected from chlorine, bromine, sulfo, sulfato, carboxy and hydroxy, benzoylamino, phenylamino, sulfophenylamino, carbamoyl, carbamoyl which is monosubstituted and disubstituted by alkyl of 1 to 4 carbon atoms, sulfamoyl, sulfamoyl which is monosubstituted or disubstituted by alkyl of 1 to 4 carbon atoms, N-phenylsulfamoyl, N-phenyl-N-(C¹-C⁴-alkyl)-sulfamoyl, cyano, nitro, chlorine, bromine, flourine trifluoromethyl, hydroxy and sulfo, or D is a naphthyl unsubstituted or substituted by 1, 2 or 3 substituents selected from the group of substituents consisting of sulfo, carboxy, methyl, ethyl, methoxy, ethoxy, alkanoylamino of 2 to 5 carbon atoms unsubstituted or substituted by substituents selected from chlorine, bromine, sulfo, sulfato, carboxy and hydroxy, benzoylamino, chlorine, hydroxy and nitro, E is a phenylene unsubstituted or substituted by 1 or 2 substituents selected from the set consisting of 2 alkyl of 1 to 4 carbon atoms, 2 alkoxy of 1 to 4 carbon atoms, 2 chlorine, 1 bromine, 1 alkanoylamino of 2 to 5 carbon atoms unsubstituted or substituted by substituents selected from chlorine, bromine, sulfo, sulfato, carboxy and hydroxy, 1 benzoylamino, 2 sulfo, 1 carboxy, 1 N,N-dialkyl-amino having alkyl groups of 1 to 4 carbon atoms each, 1 ureido, 1 phenylureido and 1 alkylsulfonylamino of 1 to 4 carbon atoms, or E is a naphthylene unsubstituted or substituted by 1 or 2 sulfo groups or by 1 alkyl group of 1 to 4 carbon atoms, 1 nitro group, 1 alkanoylamino group of 2 to 5 carbon atoms, 1 nitro group, 1 alkanoylamino group of 2 to 5 carbon atoms or 1 benzoylamino group, or substituted by 1 or 2 sulfo groups and 1 alkyl group of 1 to 4 carbon atoms, 1 nitro group, 1 alkanoylamino group of 2 to 5 carbon atoms or 1 benzoylamino group, or E is a naphthylene which contains, bonded in the orthoposition relative to that azo group which is linked to D, an amino group, an alkanoylamino group of 1 to 4 carbon atoms, a phenylamino group, a phenylamino group substituted by substituents selected from chlorine, alkyl of 1 to 4 carbon atoms, alkoxy of 1 to 4 carbon atoms, sulfo and carboxy of a hydroxy groups, and which has no additional substituents or is additionally substituted by 1 or 2 sulfo groups or 1 alkyl group of 1 to 4 carbon atoms, 1 nitro group, 1 alkanoylamino group of 2 to 5 carbon atoms or 1 benzoylamino group, or additionally substituted by 1 or 2 sulfo groups and 1 alkyl group of 1 to 4 carbon atoms, 1 nitro group, 1 alkanoylamino group of 2 to 5 carbon atoms or 1 benzoylamino group.

12. A compound according to claim 11, in which D is phenyl substituted by 1 or 2 substituents selected from the group consisting of alkyl of 1 to 4 carbon atoms, alkoxy of 1 to 4 carbon atoms, chlorine, carboxy and sulfo, at least one of these substituents being sulfo, or is naphthyl substituted by 1, 2 or 3 sulfo, and E is 1-hydroxynaphthylene which contains the group of the formula D—N=N— in the 2-position and which is substituted by 1 or 2 sulfo, or E is 1,4-phenylene unsubstituted or substituted by amino, alkylamino of 1 to 4 carbon atoms, alkanoylamino of 2 to 5 carbon atoms, methyl, ethyl, carboxy, sulfo, ureido or chlorine or by one of these substituents and by methyl, ethyl, methoxy, ethoxy, sulfo or chlorine, or E is 1,4-naphthylene unsubstituted or substituted by alkanoylamino of 2 to 5 carbon atoms or benzoylamino and 1 or 2 sulfo.

13. A compound according to claim 11, of the formula

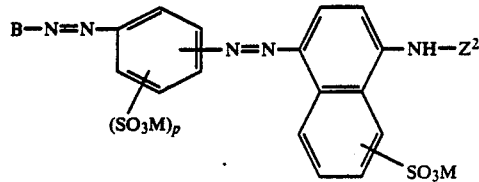

in which

B is monosulfophenyl, disulfophenyl, monosulfo-2-naphthyl, disulfo-2-naphthyl or trisulfo-2-naphthyl or a group of the formula

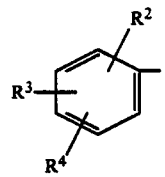

in which $R^2$ is bromine, nitro, alkanoylamino of 2 to 5 carbon atoms, hydrogen, alkyl of 1 to 4 carbon atoms, alkoxy of 1 to 4 carbon atoms, chlorine or carboxy, $R^3$ is bromine, hydroxy, hydrogen, alkyl of 1 to 4 carbon atoms, alkoxy of 1 to 4 carbon atoms, chlorine or sulfo, and $R^4$ is hydrogen or sulfo, $Z^2$ is a group of the formula

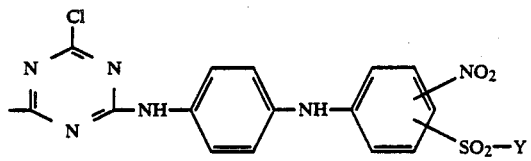

in which Y is vinyl or β-thiosulfatoethyl, β-phosphatoethyl, β-chloroethyl or β-sulfatoethyl, and the group —SO₂—Y and the nitro group are bonded to the benzene ring in the meta-position relative to each other, but both are not simultaneously in the ortho-position relative to the amino group —NH—, M is hydrogen or an alkali metal and p is the number zero, 1 or 2.

14. A compound according to claim 11, of the formula

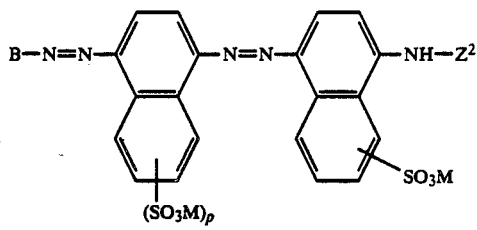

in which

B is monosulfophenyl, disulfophenyl, monosulfo-2-naphthyl, disulfo-2-naphthyl or trisulfo-2-naphthyl or a group of the formula

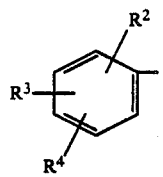

in which

R² is bromine, nitro, alkanoylamino of 2 to 5 carbon atoms, hydrogen, alkyl of 1 to 4 carbon atoms, alkoxy of 1 to 4 carbon atoms, chlorine or carboxy, R³ is bromine, hydroxy, hydrogen, alkyl of 1 to 4 carbon atoms, alkoxy of 1 to 4 carbon atoms, chlorine or sulfo, and R⁴ is hydrogen or sulfo, Z² is a group of the formula

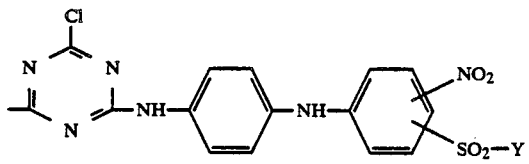

in which Y is vinyl or β-thiosulfatoethyl, β-phosphatoethyl, β-chloroethyl or β-sulfatoethyl, and the group —SO₂—Y and the nitro group are bonded to the benzene ring in the meta-position relative to each other, but both are not simultaneously in the ortho-position relative to the amino group —NH—, M is hydrogen or an alkali metal and p is the number zero, 1 or 2.

15. A compound according to claim 11, wherein D is monosulfophenyl, disulfophenyl, monosulfonaphthyl, disulfonaphthyl or trisulfonaphthyl or a group of the formula

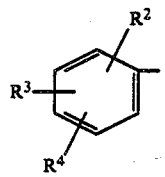

in which

R² is bromine, nitro, alkanoylamino of 2 to 5 carbon atoms, hydrogen, alkyl of 1 to 4 carbon atoms, alkoxy of 1 to 4 carbon atoms, chlorine or carboxy, R³ is bromine, hydroxy, hydrogen, alkyl of 1 to 4 carbon atoms, alkoxy of 1 to 4 carbon atoms, chlorine or sulfo, and R⁴ is hydrogen or sulfo.

16. A compound according to claim 11, wherein R¹ is hydrogen, methyl or ethyl.

17. A compound according to claim 11, wherein Z is a group of the formula

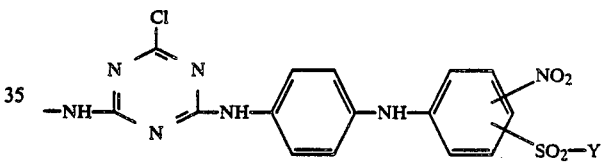

in which Y is vinyl or β-thiosulfatoethyl, β-phosphatoethyl, β-chloroethyl or β-sulfatoethyl, and the group —SO₂—Y and the nitro group are bonded to the benzene ring in meta-position relative to each other, but both are not simultaneously in ortho-position relative to the amino group —NH—.

18. A compound acording to claim 11, wherein Y is vinyl or β-sulfatoethyl.

* * * * *